(12) United States Patent
Fairchild et al.

(10) Patent No.: US 10,733,901 B2
(45) Date of Patent: Aug. 4, 2020

(54) DYNAMIC DISPATCHER TRAINING SIMULATOR

(71) Applicant: General Electric Technology GmbH, Baden (CH)

(72) Inventors: Robert Fairchild, Seattle, WA (US); Srinivasan Radhakrishnan, Redmond, WA (US); Manu Parashar, Seattle, WA (US); Jay Giri, Redmond, WA (US)

(73) Assignee: General Electric Technology GmbH, Baden (CH)

( * ) Notice: Subject to any disclaimer, the term of this patent is extended or adjusted under 35 U.S.C. 154(b) by 377 days.

(21) Appl. No.: 15/719,260

(22) Filed: Sep. 28, 2017

(65) Prior Publication Data

US 2018/0096628 A1    Apr. 5, 2018

Related U.S. Application Data

(60) Provisional application No. 62/403,680, filed on Oct. 3, 2016.

(51) Int. Cl.
*G09B 19/00* (2006.01)
*G09B 9/00* (2006.01)
*H02J 3/00* (2006.01)

(52) U.S. Cl.
CPC .............. *G09B 19/00* (2013.01); *G09B 9/00* (2013.01); *H02J 3/00* (2013.01); *H02J 2203/20* (2020.01); *Y02E 60/728* (2013.01); *Y04S 10/265* (2013.01)

(58) Field of Classification Search
CPC .................................. G09B 19/00; G09B 9/00
See application file for complete search history.

(56) References Cited

U.S. PATENT DOCUMENTS 3,889,106 A * 6/1975 Alliston ................... G09B 9/00
703/18
4,977,529 A * 12/1990 Gregg ..................... G05B 17/02
376/245

(Continued)

FOREIGN PATENT DOCUMENTS

CN        105006191 A     10/2015
EP        2 978 095 A1    1/2016

(Continued)

OTHER PUBLICATIONS

Extended European Search Report and Opinion issued in connection with corresponding EP Application No. 17194514.0 dated Dec. 5, 2017.

*Primary Examiner* — Eddy Saint-Vil
(74) *Attorney, Agent, or Firm* — Fitch Even Tabin & Flannery LLP

(57) ABSTRACT

In example embodiments, there is provided a dynamic dispatcher simulator for an electrical power system. The dynamic dispatcher simulator can be operable to receive an input from a user identity during a run time, wherein the input represents a disturbance event indicative of a simulated disturbance to an electrical power system. Based on the input, a signal can be transmitted to a transient simulation engine component. The transient simulation engine component can output simulated phasor measurement unit data representative of the disturbance event to a wide area monitoring system that facilitates a display of alarms in response to the receipt of the simulated phasor measurement unit data. The dynamic dispatcher training simulator can also receive another input from the user during the run time, the second input being representative of a simulated condition related to the electrical power system.

18 Claims, 11 Drawing Sheets

(56) References Cited

U.S. PATENT DOCUMENTS

| | | | | |
|---|---|---|---|---|
| 8,060,259 B2* | 11/2011 | Budhraja | ................ | H02J 3/008 |
| | | | | 700/291 |
| 2009/0271169 A1* | 10/2009 | Minto | ...................... | G09B 9/00 |
| | | | | 703/18 |
| 2009/0292514 A1* | 11/2009 | McKim | ................... | G09B 9/00 |
| | | | | 703/6 |
| 2009/0307233 A1* | 12/2009 | Zhang | ............... | G06F 16/24568 |
| 2011/0282508 A1* | 11/2011 | Goutard | ................... | H02J 3/06 |
| | | | | 700/293 |
| 2012/0208153 A1* | 8/2012 | Bolla | ....................... | G09B 5/08 |
| | | | | 434/219 |
| 2013/0091258 A1 | 4/2013 | Shaffer et al. | | |
| 2013/0187751 A1* | 7/2013 | Kawaguchi | ............ | G09B 25/02 |
| | | | | 340/5.6 |
| 2013/0282314 A1* | 10/2013 | Budhraja | ................ | H02J 3/008 |
| | | | | 702/60 |
| 2014/0222408 A1* | 8/2014 | Rathgeb | ................ | G05B 17/02 |
| | | | | 703/13 |
| 2015/0178288 A1* | 6/2015 | Lee | ........................ | G06F 16/44 |
| | | | | 707/758 |
| 2015/0261241 A1* | 9/2015 | McKeag | ................ | G05B 15/02 |
| | | | | 700/295 |
| 2016/0196375 A1* | 7/2016 | Nasle | ................. | G06F 17/5009 |
| | | | | 703/18 |

FOREIGN PATENT DOCUMENTS

| | | |
|---|---|---|
| EP | 3 026 773 A1 | 6/2016 |
| WO | 2008/006116 A2 | 1/2008 |
| WO | 2012/008979 A2 | 1/2012 |
| WO | 2012/035433 A2 | 3/2012 |

* cited by examiner

DYNAMIC DISPATCHER TRAINING SIMULATOR

RELATED APPLICATION

This application claims priority to U.S. Provisional Patent Application No. 62/403,680, filed Oct. 3, 2016, and titled "Dynamic Dispatcher Training Simulator (Dynamic DTS)", the entirety of which application is hereby incorporated herein by reference.

TECHNICAL FIELD

The disclosed subject matter relates generally to technology for facilitating the training of electrical power system (e.g., power grid system) operators.

BACKGROUND

A power grid is a complex and dynamic system that is difficult to manage. Often times, a power grid can comprise numerous power grid devices and a complex system of transmission lines. Furthermore, a power grid is often integrated with other power grids, resulting in a large-scale power grid system. Steady state stresses or dynamic stresses on a power grid can occur due to power transfers or outages. Therefore, a power grid is often vulnerable to potential blackouts, which might be caused by a disturbance event, which can be one or more disturbances to the grid. An aging infrastructure in many parts of the power grid system, lack of investments in capacity building, and growing demand for power based on an ever-increasing population as well as proliferation of more technology (e.g., large penetration of renewable energy sources in the system, new age transportation such as electronic vehicles, or EVs) have contributed to power grid systems operating at its stability limits. Power system operators (also referred to as dispatchers) in the control centers are tasked with using various control systems to obtain feedback and make decisions or take actions to manage the grid. New age control rooms have adopted and are continuing to develop advanced tools, such as Wide Area Management Systems (WAMS; also referred to as Wide Area Monitoring Systems) that allow for dynamic observability over a wide geography, and real-time Dynamic Security Assessment (DSA). Properly training system operators to use these new age control room applications, and to respond to the various kinds of power grid disturbance events, can facilitate management of power grid systems.

The above-described background relating to power grid systems is merely intended to provide a contextual overview of some current issues, and is not intended to be exhaustive. Other contextual information may become further apparent upon review of the following detailed description.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
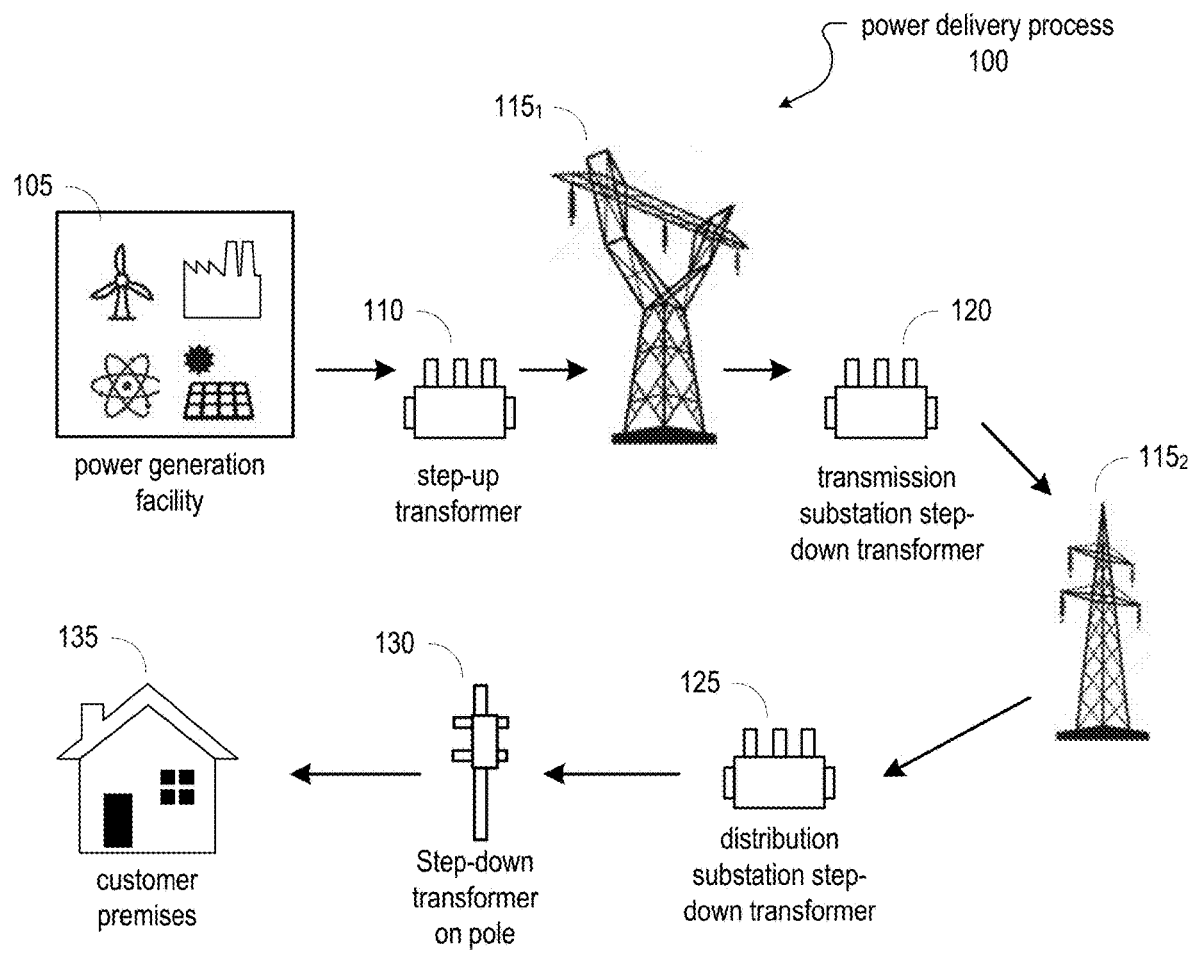
FIG. 1 illustrates a system that facilitates the delivery of electric energy to customer premises in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure.

The following description and the annexed drawings set forth in detail certain illustrative aspects of the subject matter. However, these aspects are indicative of but a few of the various ways in which the principles of the subject matter can be implemented or employed. Other aspects, advantages, and novel features of the disclosed subject matter will become apparent from the following detailed description when considered in conjunction with the provided drawings. In the following description, for purposes of explanation, numerous specific details are set forth to provide an understanding of the subject disclosure. It may be evident, however, that the subject disclosure may be practiced without these specific details. In other instances, well-known structures and devices are shown in block diagram form in order to facilitate describing the subject disclosure. For example, the methods (e.g., processes and logic flows) described in this specification can be performed by devices comprising programmable processors that execute machine executable instructions to facilitate performance of operations described herein. Examples of such devices can be devices comprising circuitry and components as described in FIG. 10 and FIG. 11.

As used in this application, the terms "component," "system," "platform," "interface," "node", "source", "agent", and the like, can refer to or can comprise a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, or a computer. By way of illustration, both an application running on a server and the server can be a component. One or more components may reside within a process or thread of execution and a component may be localized on one computer or distributed between two or more computers. Also, these components can execute from various computer readable media having various data structures stored thereon. The components may communicate via local or remote processes such as in accordance with a signal having one or more data packets (e.g., data from one component interacting with another component in a local system, distributed system, or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

In example embodiments, there is provided systems and methods for training power grid system control room operators to use next-generation tools (e.g., WAMs and WAMS-related applications). This training can comprise the use of these next generation systems alongside traditional energy management systems (e.g., Energy Management Systems (EMSs), Supervisory Control and Data Acquisition (SCADA) systems). Among other operations, a Dynamic Dispatcher Training Simulator (DDTS) component (e.g., module) can be operable to receive an input from a user during a run time in which a dispatcher training routine is executing, wherein the input represents a disturbance event indicative of a simulated disturbance to an electrical power system. Based on the input, a signal can be transmitted to a transient simulation engine component. The transient simulation engine component can output simulated Phasor Measurement Unit (PMU) data representative of the disturbance event to a WAMS that facilitates a display of alarms in response to the receipt of the simulated PMU data. The DDTS component can also receive another input from the user during the run time, the second input being representative of a simulated condition related to the electrical power system.

FIG. 1 is a diagram illustrating example embodiments of a power delivery process 100 showing components that can facilitate the generation of power and the process of delivering power (e.g., delivering energy, electricity) to customer premises. Electric power can be generated at a power generation facility, and then carried by transmission power lines to substations having transformers. A local distribution system of smaller, lower-voltage transmission lines and substations carry power to the customer premises.

Power generation facility 105 generates electricity to meet the power demands of customers. A variety of facilities can generate electricity. Power generation facilities 105 can comprise power plants that burn coal, oil, or natural gas. Power generation facilities 105 can also comprise nuclear power plants, hydroelectric dams, wind turbines, and solar panels. The location of these electricity generators, and their distance from end users, can vary widely.

After electricity has been generated by the power generation facility 105, transformers (e.g., step-up transformer 110), typically located at power plant substations adjacent to (and connected via power lines to) the power plant, will "step up" the voltage of the electricity. When power travels through power lines (e.g., metallic wires that conduct electricity), some of that power is wasted in the form of heat. The power loss is proportional to the amount of current being carried. Power companies keep the current low and compensate by stepping up the voltage.

After the voltage is stepped up, the electricity is typically carried over long distances by high voltage power transmission lines, typically supported and elevated by transmission towers (e.g., transmission tower $115_1$, $115_2$) that can be of various dimensions, materials, and heights.

Still referring to FIG. 1, the voltage is gradually reduced by step-down transformers as the electricity approaches customer premises. Transmission substations contain step-down transformers (e.g., transmission substation step-down transformer 120) that reduce the voltage of the electricity. The electricity can then be distributed on lower-voltage power lines. A typical transmission substation can serve tens of thousands of customers.

The electricity leaving transmission substations can travel through power lines to distribution substations. Distribution substations contain step-down transformers (e.g., distribution substation step-down transformer 125) that further reduce the voltage of electricity and distribute the power to cities and towns through main power lines, which can serve hundreds of customers. Distribution lines carry lower voltage power to clusters of homes and businesses, and are typically supported by wooden poles. Of note, power lines can also be buried under the ground.

Of note, substations can contain a variety of other equipment, including switches, breakers, regulators, batteries, etc.

The voltage from a branch line can further be reduced by transformers that are mounted on poles (e.g., step-down transformer on pole 130) that connect customer premises (e.g., customer premises 135) through a service drop power line.

Customer premises 135 can be of any type and variety. Customer premises can be a residential customer premises, such as residential houses. Customer premises can be an industrial customer premises, such as factories. Customer premises can be commercial customer premises, such as an office building. If a particular customer premises has a heavier load (e.g., has a higher demand for power), then a larger transformer, instead of a pole transformer, might service that particular customer premises.

Figure 2:
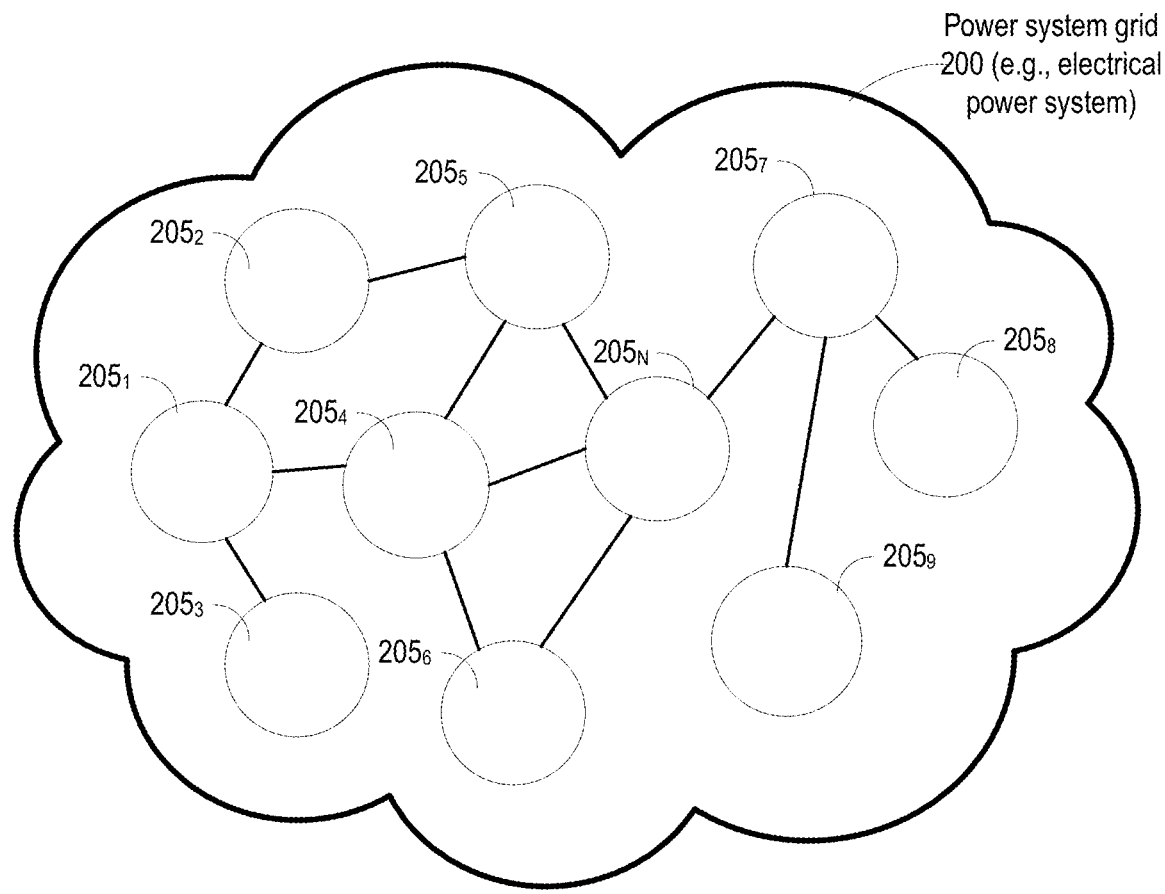
FIG. 2 illustrates an example of power grid system topology arrangements, interconnections, and architecture in accordance with aspects of the subject disclosure.

FIG. 2 depicts an illustration of a power grid system 200 (e.g., an electrical power system) comprising multitudes of nodes $205_{1-N}$, wherein a node can comprise a power generation facility, transmission substation, or a distribution substation, and is intended to convey that such facilities and substations can be interconnected. A power grid system 200 can follow a structural topology, influenced by factors such as budget, system reliability, load demand (demand for power), land, and geology. The structural topology in many cities and towns, for example many of those in North America, tends to follow a classic radial topology. This is a tree-shape wherein power from a larger voltage lines and substations radiates out into progressively lower voltage lines and substations until the customer premises are reached. A substation receives its power from a power generation facility, the power is stepped down with a transformer and sent through lines that spread out in all directions across the countryside. These feeders carry three-phase power and tend to follow major streets near the substation. As the distance from the substation grows, the fanout continues as smaller laterals spread out to cover areas missed by the feeders. This tree-like structure grows outward from the substation, but a single power failure can render inoperable entire branches of the tree. For reliability reasons, there are often unused backup connections from one substation to a nearby substation. This backup connection can be enabled in case of an emergency, such that a part of a substation's service area can be fed by another substation in case of any power failure events. Redundancy allows line failures to occur and power to be rerouted while workmen restore to service damaged or deactivated components. Neighboring power utilities also typically link their grids, thereby assisting one another to maintain a balance between power generation supply and loads (e.g., customer demand). Other topologies can be mesh topologies, looped systems (mostly found in Europe) and ring networks.

The result can be interconnected power grid systems that can form complex networks of power plants and transformers connected by hundreds of thousands of miles of high-voltage transmission lines. While these interconnections can be useful in situations, the danger or risk can comprise the possibility that a shutdown in one sector could rapidly spread to other sectors, leading to massive power failures in a wide area. The blackout of 2003 impacting several states in the northeastern United States highlighted the extent to which power systems have become interconnected over time, and the significant effect that the resulting interactions and interconnections could have on power delivery across multiple regions. The power outage impacted tens of millions of people and tens of thousands of megawatts (MW) of electric load. Some portions of the United States remained without electrical power for up to four days.

Figure 3:
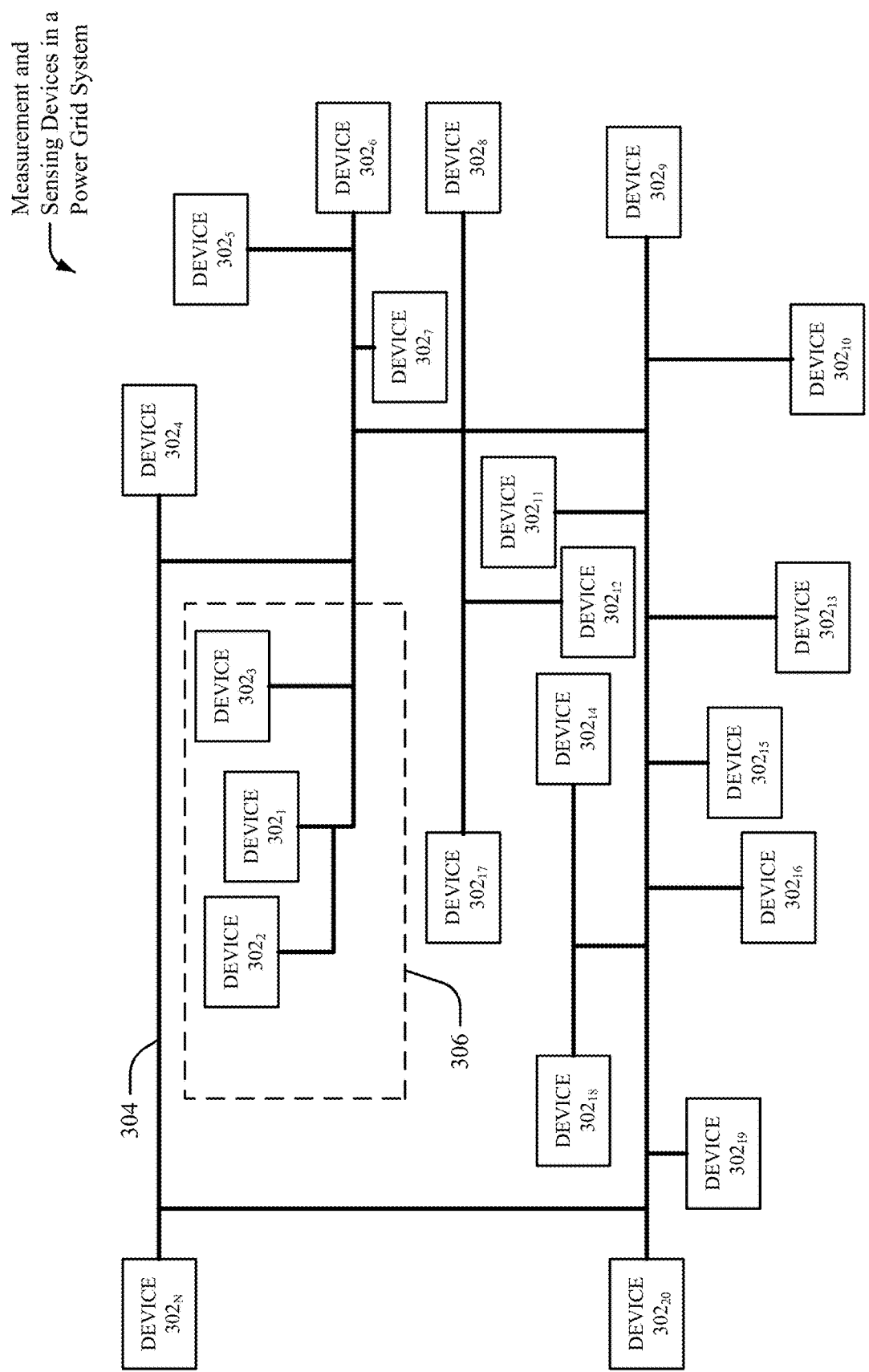
FIG. 3 illustrates measurement devices (e.g., sensing devices) in a power grid system in accordance with aspects of the subject disclosure.

FIG. 3 illustrates measurement devices $302_{1-N}$ of a power grid system 200 in accordance with aspects of the subject disclosure. Throughout a power network, a variety of sensors, monitoring devices and measurement devices (collectively referred to herein as "measurement devices") can be located at one or more nodes (e.g., nodes $205_{1-N}$), and that can be used to provide monitoring data related to power flow measurements (e.g., steady state power flow measurements) or Phasor Measurement Unit (PMU) based measurements (see below), or monitor the condition of one or more aspects of a power grid system. A majority of measurement devices (e.g., measurement devices $302_{1-N}$) deployed in the electric power system are located within, or adjacent to, power transmission components (e.g., generating units, transformers, circuit breakers), including at substations. Measurement devices can also be deployed along distribution lines. These sensors help measure a range of parameters such as voltage, current, harmonic distortion, real and reactive power, power factor, and fault current. Examples of some sensors comprise: voltage and current sensors; phase measurement units (PMUs); transformer-metal insulated semiconducting (MIS) gas in oil sensor; circuit breaker sulfur hexafluoride density sensors; conductor temperature and current sensors that record overhead transmission conductor temperatures and current magnitudes; overhead insulator leakage current sensors; transmission line surge arrester (TLSA) sensors.

In FIG. 3, a power grid system 200 can comprise measurement devices $302_{1-N}$ (also referred to as measurement devices 302) located in various parts (e.g., such as nodes) throughout the grid. The measurement devices $302_{1-N}$ can be coupled via a network of transmission lines, as well as through wireless and wired communications mediums (e.g., cellular, ethernet, etc.). For example, measurement device $302_N$ and device $302_4$ can be coupled via a transmission line 304 from a network of transmission lines associated with the devices $302_{1-N}$. Furthermore, a subset of the measurement devices $302_{1-N}$ can be associated with a sector of the power grid system 200. For example, a sector 306 of the power grid system 200 can comprise measurement device $302_1$, measurement device $302_2$ and measurement device $302_3$. In one example, the sector 306 can be a corridor of the power grid system 200. Measurement devices are described further below.

In example embodiments, the reliability of the power grid system 200 can be facilitated through the use and analysis of the data received from measurement devices $302_{1-N}$ and monitoring of system conditions that are then communicated to a central control center, where a combination of automated actions and human decision assist in striving to ensure that the power grid system 200 is stable and balanced.

Figure 4:
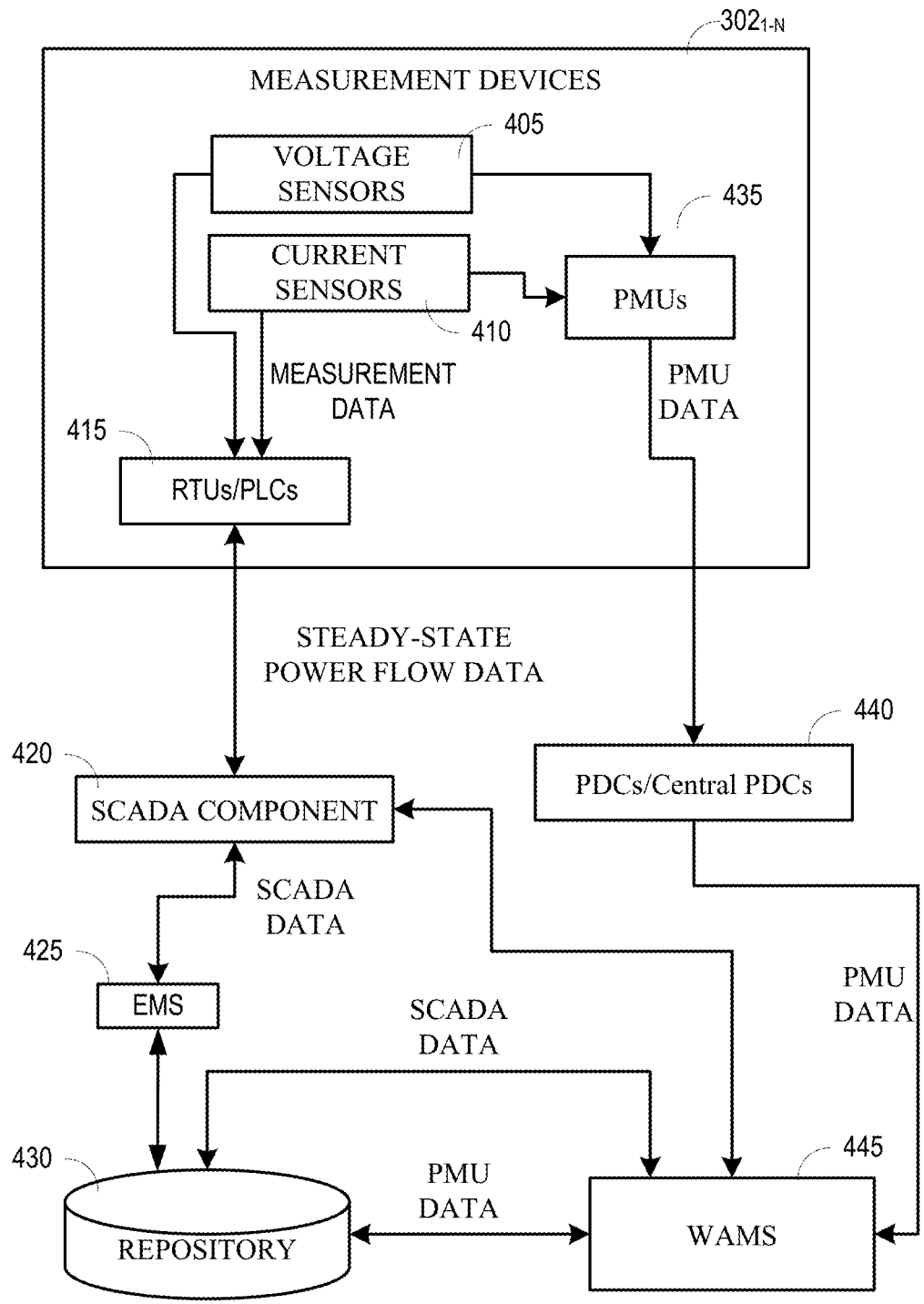
FIG. 4 illustrates an example system for collecting and processing SCADA-based data and PMU-based data.

FIG. 4 illustrates an example of embodiments of a system for obtaining information from the power grid system and for controlling the power grid management system. The various components shown in FIG. 4 can comprise software, hardware, or a combination of both (e.g., a computing device comprising a processor and a memory that stores executable instructions that, when executed by the processor, facilitate performance of operations described herein).

Measurement devices $302_{1-N}$ in FIG. 4 can obtain, monitor or facilitate the determination of electrical characteristics associated with the power grid system (e.g., the electrical distribution system), which can comprise, for example, power flows, voltage, current, harmonic distortion, frequency, real and reactive power, power factor, fault current, and phase angles. Measurement devices $302_{1-N}$ can also be associated with a protection relay, a global positioning system (GPS), a phasor data concentrator, communication capabilities or other functionalities. It is to be appreciated that the measurement device 302 can be implemented as or associated with more than one measurement device.

Measurement devices $302_{1-N}$ can provide real-time measurements of electrical characteristics or electrical parameters associated with the power grid system (e.g., the electrical distribution system). The measurement device 302 can, for example, repeatedly obtain measurements from the power grid system (e.g., the electrical distribution system) that can be used by, for example, a SCADA component, a WAMS component (discussed further below), and other associated applications that might use those measurements. Measurements obtained by the measurement device 302 can be associated with the power-flow data (e.g., steady state power flow data that can be sent to a SCADA system), or PMU based data. For example, the measurement device 302 can repeatedly obtain the power-flow data or data employed to generate the power-flow data. In an aspect, the measurement device 302 can repeatedly obtain the measurements from the power grid system during an interval of time that is less than one second. For example, the measurement device 302 can repeatedly obtain sub-second measurements from the power grid system. In a non-limiting example, an interval of time for obtaining the measurements from the power grid system can be 30 times per second. In an aspect, data generated or obtained by the measurement device 302 can be coded data (e.g., encoded data) associated with the power grid system.

Still referring to FIG. 4, measurement devices $302_{1-N}$ can comprise voltage sensors 405 and current sensors 410 that feed measurement data to Remote Terminal Units and Programmable Logic Controllers (RTUs and PLCs 415). PLCs and RTUs 415, which can be considered measurement devices as well, can be installed at power plants, substations, and the intersections of transmission and distribution lines, and can receive its data from the voltage and current sensors to which they are connected. The PLCs and RTUs can convert the measured data to digital form for transmission of the data to a SCADA system (e.g., SCADA component 420). Voltage and current magnitudes can be measured and reported to a system operator every few seconds by the SCADA component 420.

The SCADA component 420 can provide functions such as data acquisition, control of power plants, and alarm display. The SCADA component 420 can also allow operators at a central control center to perform or facilitate management of energy flow in the power grid system. For example, operators can use SCADA component 420 (for example using a computer such as a laptop or desktop) to facilitate performance of certain tasks such as opening or closing circuit breakers, or other switching operations that might divert the flow of electricity (e.g., including through the use of intelligent electronic devices (IEDs)). In example embodiments, the SCADA component 420 can also comprise central host server or servers, called master terminal units (MTUs), sometimes also referred to as a SCADA center. The MTU can also send signals to PLCs and RTUs to control equipment through actuators and switchboxes. In addition, the MTU can perform controlling, alarming, and networking with other nodes, etc. Thus, the SCADA component 420 can monitor the PLCs and RTUs 415, and can send information or alarms back to operators over telecommunications channels, so that disturbances can be monitored and grid management tasks can be performed. SCADA systems (e.g., SCADA component 420) can offer a range of measured parameters, and SCADA data can be updated at a relatively fast rate (although not as fast as a PMU-based system, as described below). Useful measurements can include active power of most power lines, power transformers and generators, reactive power of most power transformers, shunt reactors, shunt capacitors and generators, voltage of most substations, frequency measured at a few locations of the grid, status of most network switched related to power lines, power transformers and generators, transformer tap positions, etc.

The SCADA component 420 can also be associated with a system for monitoring or controlling devices in the power grid system, such as an EMS (e.g., EMS 425). An EMS can comprise one or more systems of computer-aided tools used by operators of the electric power grid systems to monitor, control, and optimize the performance of the generation or transmission system. Often, an EMS is also referred to as SCADA/EMS or EMS/SCADA. In these respects, the SCADA/EMS or EMS/SCADA can also perform the functions of a SCADA.

The SCADA component 420 can generate or provide SCADA data (e.g., SCADA DATA shown in FIG. 4) comprising, for example, real-time information (e.g., real-time information associated with the devices in the power grid system) or sensor information (e.g., sensor information associated with the devices in the power grid system). The SCADA data, can be stored, for example, in repository 430 (described further below) directly by the SCADA component 420 or via another component (e.g., EMS 425). In example embodiments, data determined or generated by the SCADA component 420 can be employed to facilitate generation of topology data (topology data is further described below) that can be employed by other components.

The employment of current sensors and voltage sensors allows for fast response. The SCADA component 420 that monitors power flow through lines, transformers, and other components typically makes measurements every two to six seconds, and passes this measurement data (e.g., steady-state power flow data) on to the SCADA component. Traditionally, SCADA systems cannot be used to observe the dynamic characteristics of the electric power system because of its slow sampling rate (e.g., cannot detect the details of transient phenomena that occur on timescales of milliseconds (one 60 Hz cycle is 16 milliseconds). Additionally, although SCADA technology enables some coordination of transmission among utilities, the process can be slow, especially during emergencies, with much of the response based on telephone calls between human operators at the utility control centers. Furthermore, most PLCs and RTUs were developed before industry-wide standards for interoperability were established, and as such, neighboring utilities often use incompatible control protocols.

Still referring to FIG. 4, measurement devices $302_{1-N}$ can also comprise Phasor Measurement Units (PMUs) 435. A PMU 435 can be a standalone device or may be integrated into another piece of equipment such as a protective relay. PMUs 435 can be employed at substations, and can provide PMU-based data (e.g., also referred to as PMU-data, PMU data, synchrophasor data), that is used by one or more software tools (e.g., a wide area management system (WAMS), a SCADA system, EMS, and other applications). Like an RTU, a PMU 435 can use voltage and current sensors (e.g., voltage sensors 405, current sensors 410) that measure voltages and currents at principal intersecting locations (e.g., substations) on a power grid using a common time source for synchronization, and can output accurately time-stamped voltage and current phasors. The resulting measurement is often referred to as a synchrophasor (although the term synchrophasor refers to the synchronized phasor measurements taken by the PMU 435, some have also used the term to describe the device itself). Because these phasors are truly synchronized, synchronized comparison of two quantities is possible in real time, and this time synchronization allows synchronized real-time measurements of multiple remote measurement points on the grid. In addition to synchronously measuring voltages and currents, phase voltages and currents, frequency, frequency rate-of-change, circuit breaker status, switch status, etc., the high sampling rates (e.g., 30 times a second) provides "sub-second" resolution in contrast with SCADA. These comparisons can be used to assess system conditions-such as: frequency changes, power in megawatts (MW), reactive power in megavolt ampere reactive (MVAR), voltage in kilovolts (KV), etc. As such, PMU measurements can provide improved visibility into dynamic grid conditions and can allow for real-time wide area monitoring of power system dynamics. Further, synchrophasors account for the actual frequency of the power delivery system at the time of measurement. These measurements are important in alternating current (AC) power systems, as power flows from a higher to a lower voltage phase angle, and the difference between the two relates to power flow. The measurement requirements and compliance tests for a PMU 435, operating in both steady state as well as dynamic conditions, have been standardized by the Institute of Electrical and Electronics Engineers (IEEE), namely IEEE Standard C37.118.

Large phase angle differences between two distant PMUs can indicate the relative stress across the grid, even if the PMUs are not directly connected to each other by a single transmission line (for example, in the 2003 blackout mentioned above, the phase angles diverged prior to the blackout). This phase angle difference can be used to identify power grid instability, and a PMU can be used to generate an angle disturbance alarm (e.g., angle difference alarm) when it detects a phase angle difference. Examples of disturbances that might cause a PMU to generate an angle disturbance alarm can comprise, for example, a line out or line in disturbance (e.g., a line out disturbance in which a line that was in service has now gone out of service, or in the case of a line in disturbance, in which case a line that was out of service has been brought back into service). PMUs can also be used to measure and detect frequency differences, resulting in frequency alarms being generated. As an example, unit out and unit in disturbances can result in the generation of a frequency alarm (e.g., a generating unit was in service, but might have gone out of service, or a unit that was out of service has come back in to service—both can cause frequency disturbances in the system that can result in the generation of a frequency alarm.). Although the disturbances mentioned (e.g., line in/out, unit in/out, load in/out) can result in angle or frequency disturbance alarms, an angle or frequency disturbance alarm might not necessarily mean that a particular type of disturbance occurred, only that it is indicative of that type of disturbance. For example, if a frequency disturbance alarm is detected, it might not necessarily be a unit in or unit out disturbance, but may be a load in or load out disturbance.

Still referring to FIG. 4, in example embodiments, multiple PMUs 435 can send their phasor data measurement outputs to one or more phasor data concentrators (PDCs), which can comprise local PDCs at a substation. The PDCs can time-synchronize phasor data to produce a real-time, time-aligned output data stream. Additionally, PDCs can exchange phasor data with PDCs at other locations. Multiple PDCs can also feed phasor data to a central PDC, corporate PDC, regional PDC, etc. which can be located at, for example a control center. Through the use of multiple PDCs, multiple layers of concentration can be implemented within an individual synchrophasor data system. With very high sampling rates (typically 10 to 60 times a seconds) and the large number of PMU installations at the substations that are streaming data in real time, most phasor acquisition systems comprising PDCs are handling large amounts of data. As a reference, the central PDC at Tennessee Valley Authority (TVA), is currently responsible for concentrating the data from over 90 PMUs and handles over 30 gigabytes (GBs) of data per day. PMU-based data can also be stored in one or more repositories (e.g., repository 430) by PDCs/Central PDCs 440, or some other application or component that receives PMU-based data (e.g., in some embodiments, EMS, SCADA, or WAMS, which is discussed below).

Still referring to FIG. 4, the PDCs/Central PDCs 440 can feed phasor-based data to other systems, for example, the SCADA component 420, energy management system (EMS), synchrophasor applications software systems, or some other control center software system. One such system is also referred to as a wide area management system (WAMS; also referred to as wide area monitoring system), which provides for dynamic observability over a wide geography. As shown in FIG. 4, the output from PDCs/Central PDCs 440 can be to a WAMS component 445. In some example embodiments, WAMS can also comprise a PDC or central PDC component 440, such that the WAMS and PDC/Central PDC components are more integrated. WAMS and WAMS-related applications can enable the monitoring of power grid system dynamics in real time to identify system stability related weaknesses, and aid in or facilitate the development and implementation of countermeasures. Because the PMU-data that drives WAMS and WAMS-related applications allows for the delivery of more precisely time synchronized values of voltage and current phasors and other power system related quantities like frequency, they provide more situational awareness of the state of the power grid system and are considered a generation above conventional SCADA systems. WAMS can also be considered a supplemental to SCADA and EMS systems, wherein operating both a SCADA/EMS and WAMS can provide separate views of the state of a power grid system.

In some example embodiments, one or more of the WAMS 445, EMS 425 and SCADA 420 components can be integrated. For example, the WAMS component 445 can receive data from, or output data to, an EMS or SCADA. As another example, SCADA 420 can be operable to send data (e.g., SCADA data) to the EMS 425, which can in turn provide the data to a WAMS component 402.

The WAMS 445, EMS 425, and SCADA 420 can also be associated with other systems (applications, modules, components). Example systems can comprise a situational awareness system for the power grid system, a visualization system for the power grid system, a monitoring system for the power grid system (e.g., oscillation monitoring applications, phase angle monitoring applications, voltage stability monitoring applications, thermal monitoring applications), state estimation application, contingency analysis application, a stability assessment system, islanding/resync management applications, etc. Some example traditional (e.g., steady-state) EMS/SCADA applications can receive and utilize SCADA-based data, some example applications can receive and utilize PMU-based data, and some example applications (also referred to as "integrated" or "hybrid") can receive and utilize both PMU-based data and SCADA-based data.

Figure 10:
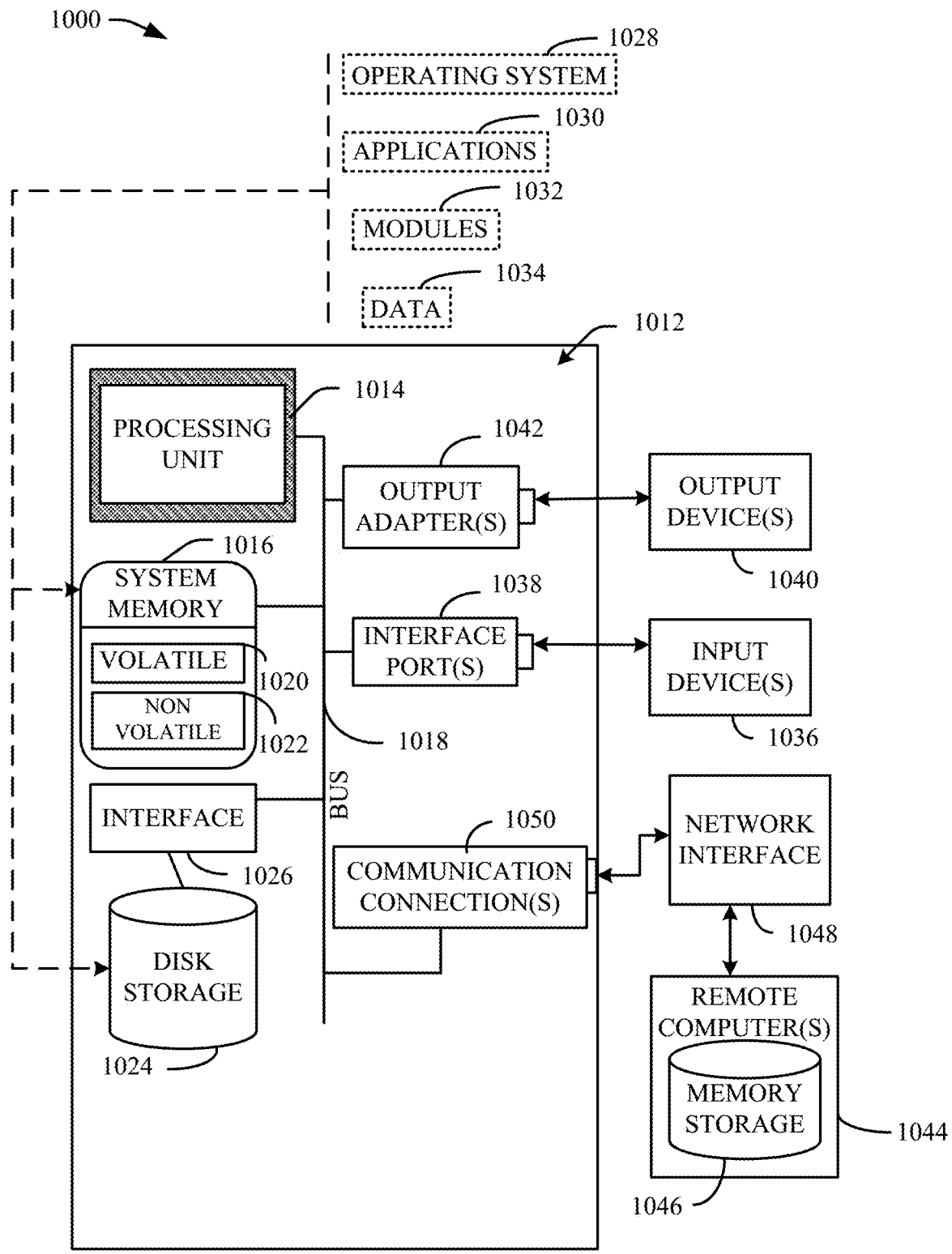
FIG. 10 is a schematic block diagram of a sample-computing environment.
Figure 11:
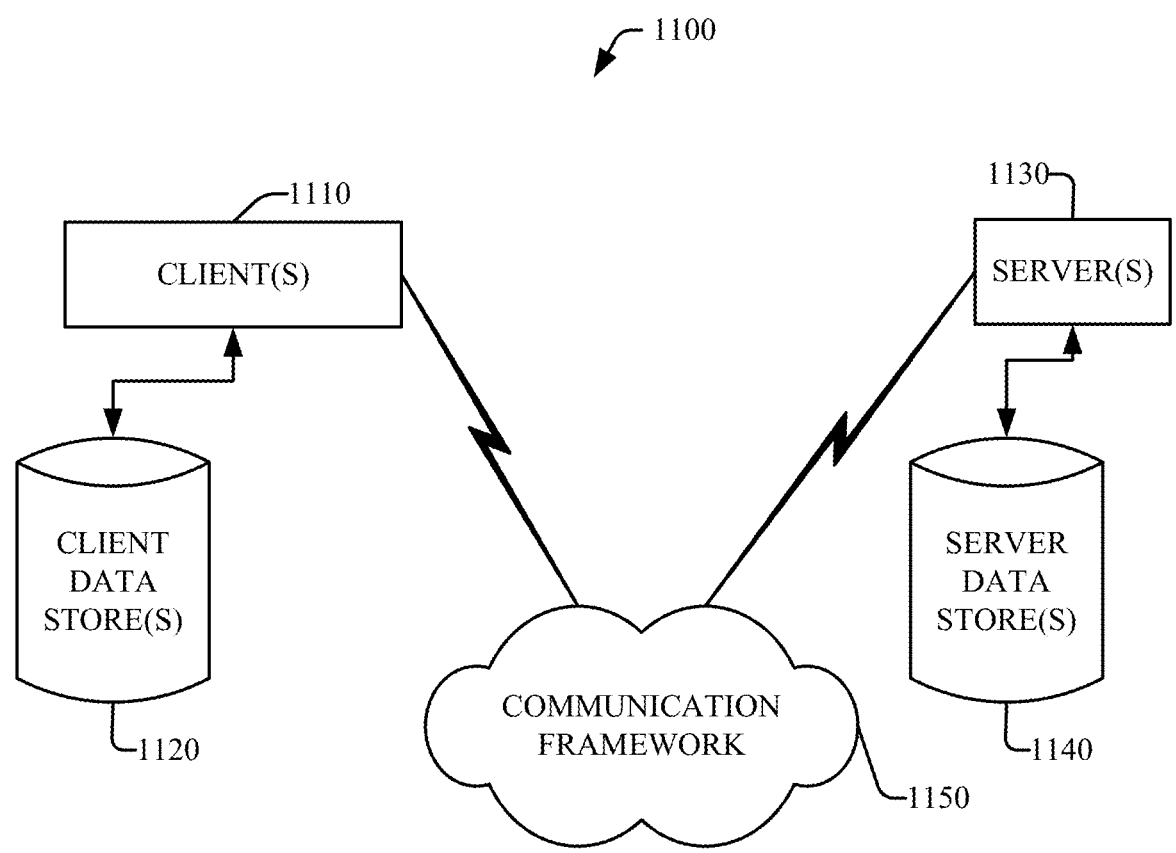
FIG. 11 depicts a diagram of an example client-server network environment in which various aspects of the disclosed subject matter can be practiced.

Still referring to FIG. 4, one or more repositories (e.g., repository 430), which can be local (e.g., disk storage 1024 in FIG. 10, client data store(s) in FIG. 11, etc.) or networked (e.g., memory storage 1046 in FIG. 10, server data store(s) 1140) in FIG. 11, etc.) can be provided storing various information. Data in various forms can be data stored (either directly, or indirectly) by components comprising RTUs/PLCs 415, SCADA 420, EMS 425, PDCs/Central PDCs 440, WAMS 445, or any other components or subcomponents that receive or use the data.

As further described below, the data can comprise information generated by measurement devices $302_{1-N}$ (including from PMUs, meters, sensors, and other equipment in the power grid system) indicative of measurements that are repeatedly obtained from a power grid system, and can also comprise other data such as data generated by SCADA 420, EMS 425, or WAMS 445, such as topology data, disturbance event data, analysis data, historical data.

In example embodiments, the data stored in the repository 430 can be associated SCADA data and PMU data. The SCADA data and PMU data in repository 430 can comprise PMU/SCADA-based equipment data, such as, for example, data associated with a particular unit, line, transformer, or load within a power grid system (e.g., power grid system 200). The data can comprise voltage measurements, current measurements, frequency measurements, phasor data (e.g., voltage and current phasors), etc. The data can be location-tagged. For example, it can comprise a station identification of a particular station in which a power delivery device being measured is located (e.g., "CANADA8"). The data can comprise a particular node number designated for a location (e.g., "Node 3"). The data can comprise the identity of the measure equipment (e.g., the identification number of a circuit breaker associated with an equipment). The data can also be time-tagged, indicating the time at which the data was measured by a measurement device. The PMU/SCADA-based equipment data can also contain, for example, information regarding a particular measurement device (e.g., a PMU ID identifying the PMU from which measurements were taken).

In example embodiments, the data stored in repository 430 can comprise not only collected and measured data from various measurement devices $302_{1-N}$, the data can also comprise data derived from that collected and measured data. The data derived can comprise topology data (e.g., PMU/SCADA-based topology data), event data, event analysis data, etc.

In example embodiments, the repository 430 can contain topology data (e.g., PMU/SCADA-based topology data) indicative of a topology for the power grid system 200. The topology of a power grid system can relate to the interconnections among power system components, such as generators, transformers, busbars, transmission lines, and loads. This topology can be obtained by determining the status of the switching components responsible for maintaining the connectivity status within the network. The switching components can be circuit breakers that are used to connect (or disconnect) any power system component (e.g., unit, line, transformer, etc.) to or from the rest of the power system network. Typical ways of determining topology can be by monitoring of the circuit breaker status, which can be done using measurement devices and components associated with those devices (e.g., RTUs, SCADA, PMUs). It can be determined as to which equipment has gone out of service, and actually, which circuit breaker has been opened or closed because of that equipment going out of service. The topology data can be indicative of an arrangement (e.g., structural topology, such as radial, tree, etc.) or a power status of devices in the power grid system. Connectivity information or switching operation information originating from one or more measurement devices 302 can be used to generate the topology data. The topology data can be based on a location of devices in the power grid system, a connection status of devices in the power grid system or a connectivity state of devices in the power grid system (e.g., devices that receive or process power distributed in throughout the power grid system, such as transformers and breakers). For example, the topology data can indicate where devices are located, and which devices in the power grid system are connected to other devices in the power grid system (e.g., where devices in the power grid system are connected, etc.) or which devices in the power grid system are associated with a powered grid connection. The topology data can further comprise the connection status of devices (e.g., a transformer, etc.) that facilitate power delivery in the power grid system, and the statuses for switching operations associated with devices in the power grid system (e.g., an operation to interrupt, energize or de-energize or connect or disconnect) a portion of the power grid system by connecting or disconnecting one or more devices in the power grid system (e.g., open or close one or more switches associated with a device in the power grid system, connect or disconnect one or more transmission lines associated with a device in the power grid system etc.). Furthermore, the topology data can provide connectivity states of the devices in the power grid system (e.g., based on connection points, based on busses, etc.).

In example embodiments, the repository 430 can contain a variety of event and event analysis data, which can be derived based on PMU data, and in some embodiments, other data as well (e.g., SCADA data, other measurement data, etc.). The data can comprise information regarding events related to the power grid system 200. A disturbance event can comprise, for example, one or more disturbances to the power grid system. A disturbance can comprise, for example, a line disturbance (e.g., line in, or line out), a unit disturbance (e.g., unit in or unit out), or load disturbance (load in or load out). For each event, relevant information such as the station where the event occurred, the voltage level associated with the station (e.g., 500 kV), the node number related to the event, the equipment related to the event, the change in real and reactive power, and change in voltage per unit (e.g., p.u.) for the event.

The data on the repository 430 can be accessed by SCADA component 420, the PDCs 440, EMS 425, WAMS 445, or others systems, such as synchrophasor related applications (not shown). In example embodiments, the WAMS component 445 can be operable to send instructions to one or more other systems (e.g., SCADA component 420, PDCs 440, EMS 425) to retrieve data stored on the repository 430 and provide it the WAMS component 445 to other applications that use such data. In other embodiments, the WAMS 445 can facilitate retrieval of the data stored in repository 430 directly.

Because synchrophasor-based systems such as WAMS and WAMS-related applications (e.g., components and applications that utilize on PMU-based measurement data) can be seen as the next generation EMS and SCADA systems, operators should be trained and accustomed to these systems that can monitor and act based on data that is several times faster than conventional SCADA in a control room environment. In an example training environment (e.g., standalone WAMS training environment) data representing simulated events (e.g., planned outages, faults, and acts of God) can be created by an instructor. The data representing the simulated events can be generated by a transient simulation engine (e.g., TSAT, a commercially available application from Powertech Labs Inc.), and fed to a WAMS or WAMS-related application (e.g., PhasorPoint, a commercially available application from General Electric). However, in this standalone training environment, the instructor (or trainer) does not have control of event assertion once the simulation has begun to run. In another example training environment involving historical event playback, WAMS and WAMS-related applications (e.g., PhasorPoint, a commercially available application from General Electric) can retrieve key event captures of interest and replay the event through the WAMS and WAMS-related applications to reconstruct displays for the operator. In this historical event playback environment (e.g., a playback of displays based on PMU measurements captured from the field), the trainer also cannot model or introduce any disturbances or power system events.

The systems and methods of the present application can therefore provide a dynamic dispatcher training system with synchrophasor application capabilities to train operators and allow trainers to conduct "what-if" scenarios (e.g., allow for the introduction of simulated disturbances in run time) and studies in a simulated environment, and allow for various visualizations of both traditional (e.g., steady state) and PMU-based (e.g., dynamic) data.

Figure 5:
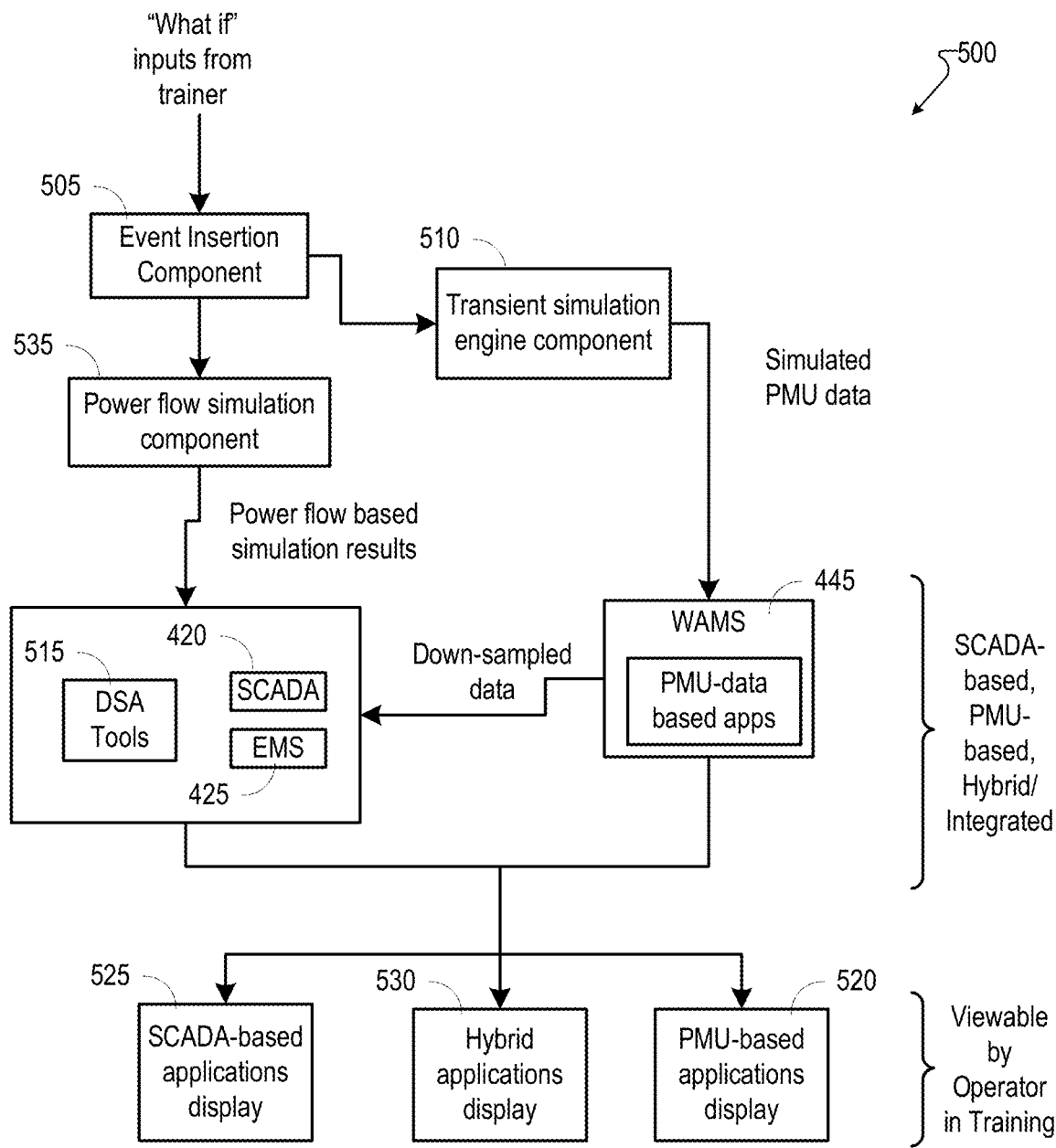
FIG. 5 is a high-level block diagram of an example dynamic dispatcher training simulator system in accordance with aspects of the subject disclosure.

Moving on to FIG. 5, a diagram of an example dynamic dispatcher training simulator 500 (DDTS 500). Aspects of the DDTS 500 can constitute machine-executable one or more components embodied within one or more machines (e.g., embodied in one or more computer readable mediums (or media) associated with one or more machines). Such component or components, when executed by the one or more machines (e.g., computers, computing devices, virtual machines, etc.) can cause the one or more machines to perform the operations described herein. In an aspect, the DDTS 500 can comprise one or more memories for storing computer executable components and instructions. The DDTS 500 can further comprise a processor to facilitate operation of the instructions (e.g., computer executable components and instructions) by the DDTS 500. In some example embodiments, the DDTS 500 can comprise several modules for facilitating the performance of operations as described herein. In other example embodiments, the DDTS 500 component can be (or can be viewed as) one module that can facilitate the performance of operations as described herein.

In accordance with aspects of the subject disclosure, the DDTS 500 can provide for an integrated training environment for facilitating the familiarization of operators with synchrophasor applications alongside traditional components, such as EMS and SCADA, which can make for a more effective training program. The DDTS 500 can be operable for triggering dynamic simulations using a transient simulation component (e.g., an example of an available commercial transient simulation engine is PowerTech TSAT) that can generate synthetic measurement data (which can comprise synchrophasor data) that drives synchrophasor applications (such as oscillatory stability monitoring, disturbance detection and characterization, islanding, etc.). The generation of synthetic synchrophasor measurement data (e.g., PMU-based data) can be performed in close synchronism with a conventional dispatcher training simulator, which powers steady-state applications within a conventional EMS component (e.g., applications such as state estimation, contingency analysis, etc.). As opposed to the traditional dispatcher training simulators where the results are from a powerflow calculation running every few seconds (typically, every 4 seconds), the DDTS 500 can be operable to produce sub-second data. The DDTS 500, which can be operable to produce PMU data based on simulated input events, can allow for true time-domain, dynamic simulation with integration step sizes as small as 10 ms. Such fast dynamic simulation facilitates the DDTS 500 to produce results at PMU resolutions (e.g. 30 to 60 samples per second). In example embodiments, the DDTS 500 can also be operable to produce PMU data in a IEEE standard C37.118 format so that it can be compatible with any Phasor Data Concentrator (PDC) that adheres to industry the standards. Sub-second simulation results can then be broadcasted to both new generation synchrophasor applications in addition to advanced EMS applications and the SCADA system. The simulation results of the DDTS 500 can thus more closely agree or simulate actual field measurements and real events.

The DDTS 500 can comprise an event insertion component 505. In example embodiments, a first user identity, who can be a trainer (also referred to as an instructor, or demonstrator), can create "what-if" scenarios for training purposes by inserting simulated disturbance events. For example, the trainer can view a map showing the location of substations of a power grid system (e.g., nodes), equipment of the power grid system (e.g., generating units, transformers, loads, lines) with its associated measurements or calculated results reflecting the disturbance in the system as if happened in real-time. To simulate a disturbance event, which can comprise several disturbances, the event insertion component 505 can be operable to allow the trainer to insert (or input) one of more disturbances into the system. For example, a trainer can use the event insertion component to create a line outage in a certain location, simulating a severe storm that led to trees that have brought down a series of power lines. As another example, a trainer can simulate a transformer being taken out of service, and then put back into service.

In some scenarios, there might be an indication that a line may have gone out and the breaker connected to the line has opened, resulting in a frequency alarm being generated, but in actuality, an interceding generator has gone out. In other instances, alarms can depend on the high/low settings that a user identity (e.g., a power system operator) has implemented. If a user has not configured settings properly, alarms might be generated, but a correlation with topology might show that there is nothing to worry about (e.g., a false positive). Data quality issues might also lead to false positives.

An instructor can be able to present a plethora of scenarios to which the operating in training can respond. The event insertion component 505 can continue to receive inputs from the trainer, even though the second user identity (e.g., trainee) might still be reacting to, and responding to, the simulated first disturbance. Thus, the trainer can model and control the insertion of events in run-time (e.g., the period during which a training routine is executing).

After event assertion, the DDTS 500 can generate a signal that is received by a transient simulation engine component 510 (e.g., an example of an available commercial transient simulation engine is PowerTech TSAT). The signal can contain information that reflects the disturbance event that was chosen by the trainer, and this information can be used by the transient simulation engine component 510 to make a determination as to the contents of the simulated synchrophasor data (e.g., C37.118 compliant data) to output. The transient simulation engine component 510 can thus generate PMU data that is consistent with the training scenario that was selected by the trainer. Thus, for a line outage, the simulation engine component 510 can generate a simulated synchrophasor data output that is consistent with a line outage.

The simulated synchrophasor data output from the transient simulation engine component 510 can feed into a WAMS component (e.g., WAMS component 445), which can also have PDC functionality. In a training environment, the WAMS component 445 (as well as other components invoked during training) can reside on a training server for training purposes, whereas in an actual non-training environment, a WAMS component 445 serves an actual control room system and can be coupled to PMUs in the field, instead of a being coupled to a transient simulation engine component 510.

Still referring to FIG. 5, after receiving the synchrophasor data from the transient simulation engine, the WAMS component 445 can perform alert actions based on the received synchrophasor data. The alert actions can include visual and auditory alerts. Auditory alerts can be beeps, tones, or other sounds audible to a dispatcher (e.g., operator). Graphical user interfaces of the training server WAMS 445 can be operable to display information based on the synchrophasor data, including waveforms, a map with nodes, topological data, visual alerts, etc.

As an example, if the disturbance introduced in the event insertion component 505 by the trainer comprises a unit out disturbance the WAMS can be operable to generate an alarm that is a PMU-based frequency alarm associated with the unit out disturbance (as mentioned above, line in/out disturbances typically result in the generation of an angle disturbance alarm; unit in/out disturbances typically result in the generation of a frequency disturbance alarm; load in/out disturbances typically result in the generation of a frequency disturbance alarm). Likewise, if the disturbance is a line out (e.g., line outage), the correlating PMU-based alarm should be an angle disturbance alarm.

Still referring to FIG. 5, in the training environment, WAMS 445 can be associated with other client applications (which may be modules that are part of the WAMS 445, or separate modules) that utilize PMU-based data.

In example embodiments, the WAMS 445 can be operable to output data that is down-sampled and sent to EMS or SCADA applications (e.g., EMS 425, SCADA component 420), and also a dynamic security assessment (DSA) tool 515, wherein the DSA tools can allow for a snapshot of the power grid system to be take and a security analysis to be performed in near-real-time with enough speed to either invoke automatic controls or permit operators to take necessary protective actions to ensure adequate security is maintained. DSA systems in use today can be capable of assessing transient security, voltage security, and small-signal security.

The output of PMU-based applications, traditional SCADA based applications, and hybrid/integrated applications (e.g., using both SCADA and PMU-based data) can be output to one or more displays (e.g., PMU-based applications display 520, SCADA-based applications display 525, and hybrid applications display 530). The one or more displays can be viewed by the operator in training. The operator can respond to the displayed information, which can be reflective of events input by the operator, including events input during the simulation (e.g., run time).

Thus, the changes made or introduced via the DDTS (such as breaker openings) are reflected on the dynamic side for the synchrophasor applications. Further, when events are introduced, changes are observable on both SACDA-based EMS and PMU-based WAMS. In this way, the results being presented to the operator via the synchrophasor applications (i.e. the new applications that the operators are being trained on) can be more completely in sync with what's being presented within the EMS applications (i.e. the more conventional applications with which operators are currently familiar). As an example, alarms and composite events can be used by integrated alarms applications, and the operators do not need to switch between screens. As such, the DDTS more fully mimics the operational environment in a control-room, allowing the trainee to change the course of the system's response in real-time.

In example embodiments, the DDTS 500 can allow for streaming of high-resolution measurements to the SCADA component (e.g., SCADA component 420). The DDTS 500 can be capable of operating in a "Slow Mode," as well as a "Fast Mode." In the slow mode, the event insertion component can send power flow based simulation results (e.g., simulated steady-state power flow data) to the SCADA component (e.g., via a power flow simulation component 535, which can provide simulated results/data representative of steady-state non-PMU based measurements), besides driving and keeping the fast simulation engine (e.g., the PMU-based simulated data generation components) in sync with network changes in the EMS side. When in fast mode, the DDTS 500 allows for the performance of a state calculation based on the bus voltages and frequency obtained from the fast engine. This method of calculation and updating SCADA ensures that the fast transients and non-uniform frequency effects are observable on the SCADA side, and on any downstream EMS application in the simulation environment.

In example embodiments, the DDTS 500 can leverage available functionalities (e.g., standalone training environment using pre-prepared data representing simulated events, historical event playback) while adding new synchrophasor capabilities to it. Thus, the DDTS 500 can provide for an integrated simulation environment that caters data and a training environment for traditional EMS applications, and the advanced EMS and WAMS applications that can work with fast, synchrophasor data.

Figure 6:
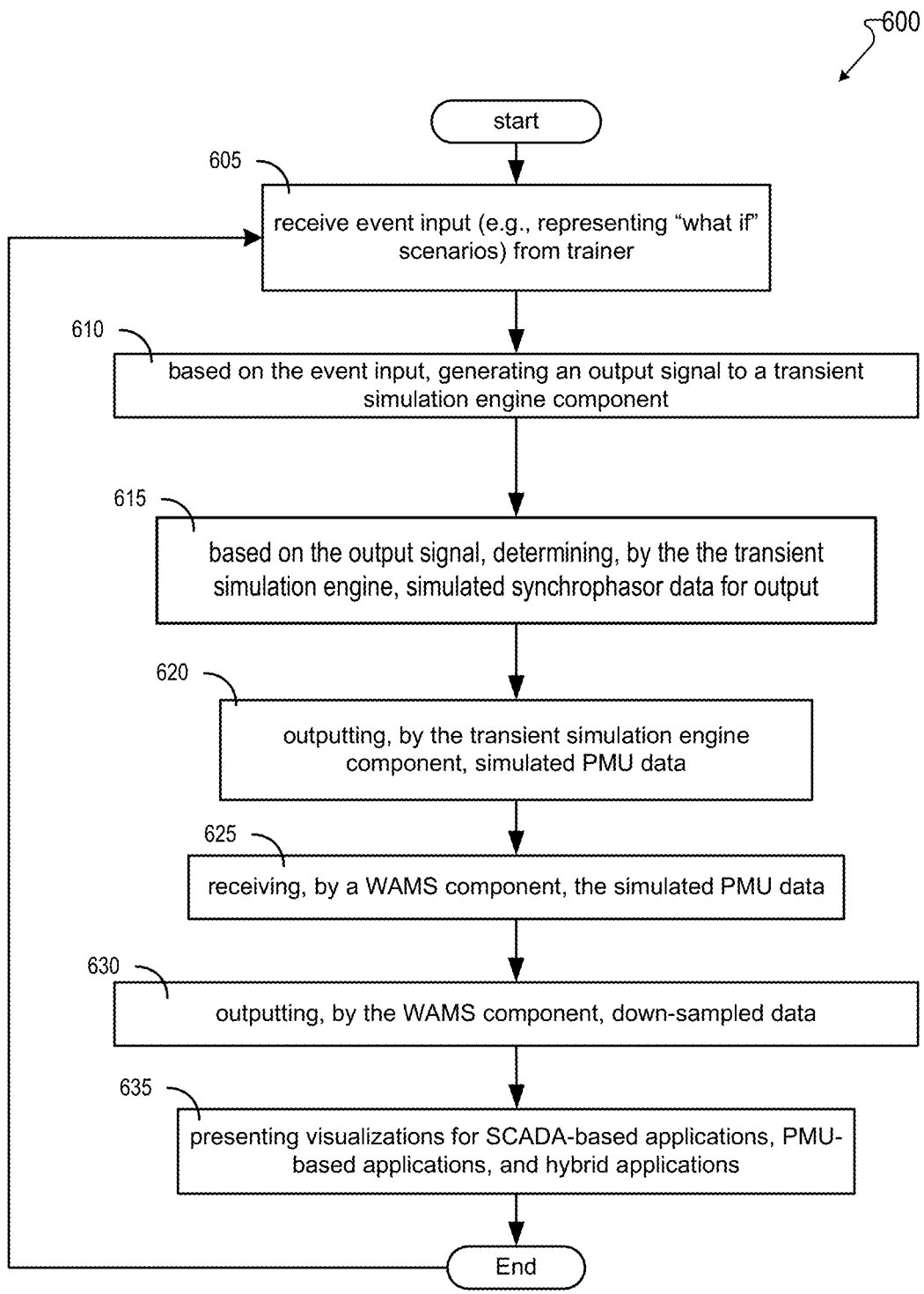
FIG. 6 illustrates an example operation that can be performed by the dynamic dispatcher training simulator system, and more specifically, components of the dynamic dispatcher training simulations system, in accordance with aspects of the subject disclosure.

FIG. 6 describes a method that can be performed by the DDTS 500, including the one or more components comprising the DDTS 500. As mentioned above, the DDTS 500 can be one or more machines comprising memory for storing computer executable components and instructions. The DDTS 500 can further comprise one or more processors for facilitate operation of the instructions (e.g., computer executable components and instructions) for performing the method described in FIG. 6.

Referring to FIG. 6, at step 605, one or more inputs can be received representing "what if" scenarios. The inputs can be received by an event insertion component (e.g., event insertion component 505). The inputs can be entered into the system by a first user identity, who can be referred to as a trainer, instructor, or demonstrator. The inputs can be representative of a disturbance event, which can comprise one or more disturbances to the grid (e.g., line out, unit out, load out disturbances). As examples, a trainer can use the event insertion component to create a line outs in a certain location, simulating a severe storm that led to trees that have brought down a series of power lines, or a trainer can simulate a transformer being taken out of service, and then put back into service. The insertion of events can continue even though the second user identity (e.g., trainee) might still be reacting to, and responding to, the simulated first disturbance. Thus, the trainer can model and control the insertion of events in run time.

Still on FIG. 6, the method can continue to step 610, wherein, based on the event input in step 610, an output signal can be generated and received. The output signal can be generated by the event insertion component (e.g., event insertion component 505) and the output signal can be received by a transient simulation engine component (e.g., transient simulation engine component 510). The output signal can contain information that reflects the disturbance event that was chosen by the trainer.

At step 615, the information contained in the output signal can be used by the transient simulation engine component (e.g., transient simulation engine component 510) to determine simulated synchrophasor data (e.g., C37.118 compliant data) for output (e.g., make a determination as to the contents of the simulated synchrophasor data to output, or configure the simulated synchrophasor data to be output).

At step 620, the method can involve outputting simulated synchrophasor data (e.g., outputting by the transient simulation engine 510). The transient simulation engine component 510 can generate PMU data that is consistent with the training scenario that was selected by the trainer. Thus, as an example, for a line outage, the simulation engine component 510 can generate a simulated synchrophasor data output that is consistent with or representative of a line outage.

At step 625, the output simulated synchrophasor data can be received. It can be received by a WAMS component (e.g., WAMS component 445), which can also have PDC functionality. The WAMS component might reside on a training server. In a training environment, the WAMS component (as well as other components invoked during training) can reside on a training server for training purposes, whereas in an actual non-training environment, a WAMS component serves an actual power grid system and can be coupled to PMUs in the field, instead of a being coupled to a transient simulation engine component.

At step 630, the operations can comprise outputting down-sampled data. The outputting can be performed by the WAMS (e.g., WAMS component 445) for use by EMS (e.g., EMS 420) and SCADA (e.g., SCADA 420), as well as for use by DSA 515.

At step 635, visualization can be presented to a second user identity (e.g., operator in training, dispatcher in training, trainee). The visualizations can be presented as outputs from applications, such as SCADA-data based applications, PMU-data based applications, and also hybrid applications (e.g., those applications that use both SCADA-data and PMU-data). The operator can respond to the displayed information, which can be reflective of events input by the operator, including events input during the simulation (e.g., run time).

Thus, the changes made or introduced via the DDTS by the trainer can be observable on both SACDA-based EMS and PMU-based WAMS applications. In this way, the results being presented to the operator via the synchrophasor applications (i.e. the new applications that the operators are being trained on) can be more completely in sync with what's being presented within the EMS applications (i.e. the more conventional applications with which operators are currently familiar).

Figure 7:
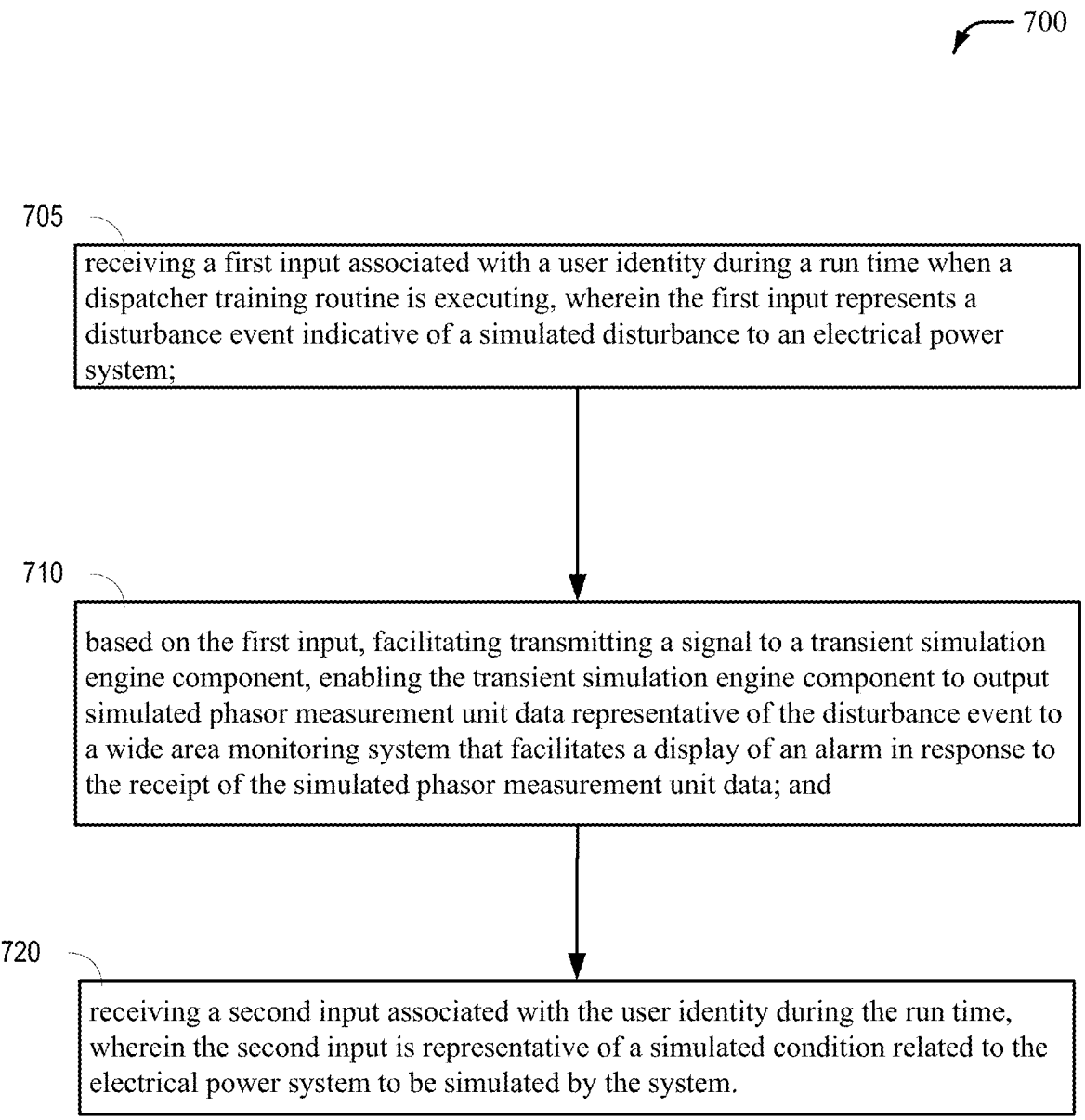
FIG. 7 illustrates an example device operable to perform dynamic dispatcher training simulations operations in accordance with aspects of the subject disclosure.
Figure 8:
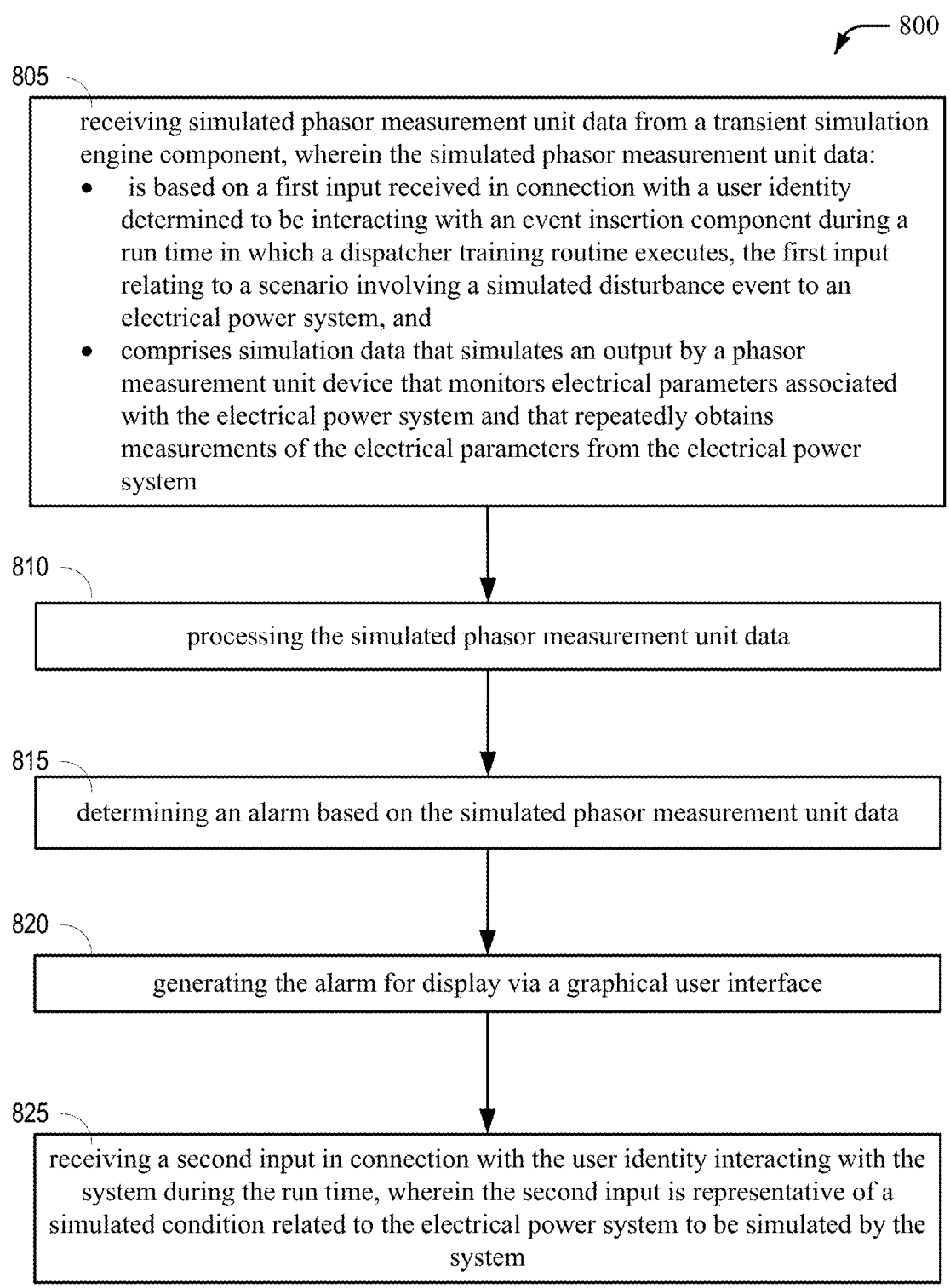
FIG. 8 illustrates an example device operable to perform dynamic dispatcher training simulations operations in accordance with aspects of the subject disclosure.
Figure 9:
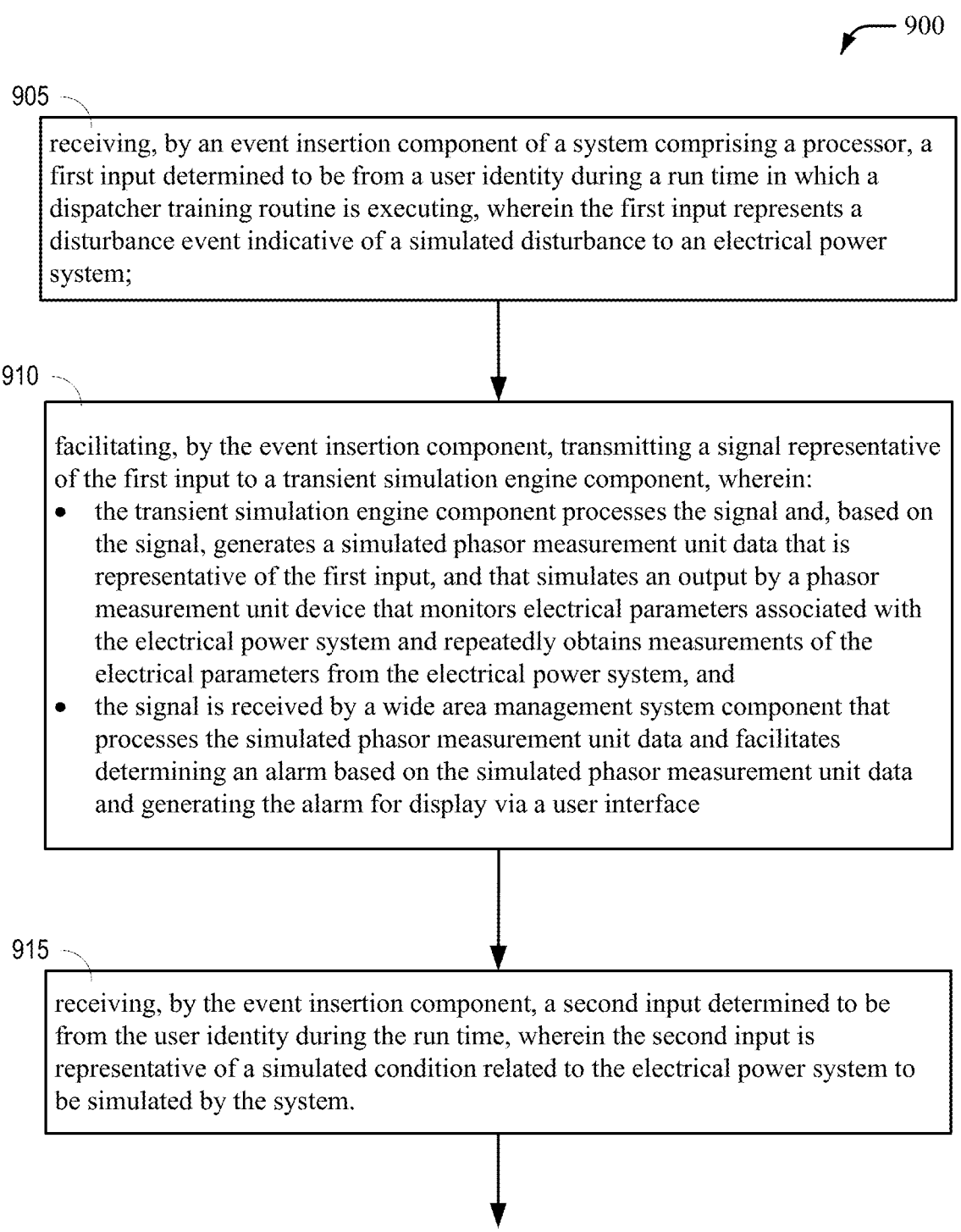
FIG. 9 illustrates an example method for performing dynamic dispatcher training simulations operations in a power grid system in accordance with aspects of the subject disclosure.

In view of the example system(s) described above, example method(s) that can be implemented in accordance with the disclosed subject matter can be better appreciated with reference to flowcharts as shown in FIGS. 7-9. For purposes of simplicity of explanation, example methods disclosed herein are presented and described as a series of acts; however, it is to be understood and appreciated that the claimed subject matter is not limited by the order of acts, as some acts may occur in different orders or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Now referring to FIG. 7, in non-limiting embodiments (also referred to as example embodiments), a system, comprising a processor and a memory that stores executable instructions (e.g., stored on a machine-readable storage medium), that can, when executed by the processor, facilitate performance of operations (e.g., perform a method), or cause a device comprising a processor to perform operations. An example of such a system can be computer 1012 as described below in FIG. 10, or client(s) 1110 as described below in FIG. 11.

At step 705, the operations can comprise receiving a first input associated with a user identity (e.g., a trainer, instructor, demonstrator, etc.) during a run time when a dispatcher training routine is executing, wherein the first input represents a disturbance event indicative of a simulated disturbance (e.g., line in/out, unit in/out, load in/out, etc.) to an electrical power system (e.g., power grid system). The input can be received, for example, by the event insertion component 505. The first input can be representative of a "what if" scenario presented to a second user identity (e.g., trainee, dispatcher in training, operator in training).

At step 710, the operations can comprise, based on the first input, facilitating transmitting a signal to a transient simulation engine component (e.g., transient simulation engine component 510), enabling the transient simulation engine component to output simulated phasor measurement unit data (e.g., PMU-data) representative of the disturbance event to a wide area monitoring system (e.g., wide area management system, WAMS, WAMS component 445) that facilitates a display of an alarm in response to the receipt of the simulated phasor measurement unit data.

At step 720, the operations can further comprise receiving a second input associated with the user identity during the run time, wherein the second input is representative of a simulated condition related to the electrical power system to be simulated by the system.

Thus, the trainer can model and control the insertion of events in run time. The second user identity can respond to the displayed information (which can include alarms and other information), which can be reflective of events input by the operator, including events input during the simulation (e.g., run time).

Still referring to FIG. 7, in example embodiments, the simulated phasor measurement unit data simulates an output by a phasor measurement unit device (e.g., PMU 435) that monitors an electrical parameter associated with the electrical power system and repeatedly obtains measurements of the electrical parameter from the electrical power system. In example embodiments, the wide area monitoring system (e.g., WAMS 445) can transmit the simulated phasor measurement unit data as a down-sampled dataset to be used by an energy management system component (e.g., EMS 425) that facilitates management of the electrical power system. In example embodiments, the wide area monitoring system (e.g., WAMS 445) can transmit the simulated phasor measurement unit data as a down-sampled dataset to be used by a SCADA component (e.g., SCADA component 420) that acquires power delivery related information and controls power delivery equipment in the electrical distribution system. In example embodiments, the wide area monitoring system (e.g., WAMS 445) can transmit the simulated phasor measurement unit data as a down-sampled dataset to be used by a security assessment tool, which can be a dynamic security assessment tool (e.g., DSA tools 515), that performs system security related analysis of the electrical power system.

Still referring to FIG. 7, the alarm can relate to an angle disturbance alarm generated in response to a detection by the phasor measurement unit device of a difference in phase angle of a voltage associated with the electrical power system, and more specifically, with different nodes in an electrical power system. The alarm can also relate to a frequency disturbance alarm generated in response to a detection by the phasor measurement unit device of a frequency disturbance associated with the electrical power system, or a difference in frequency associated with the electrical power system. In addition to alarms, other alert actions can be performed (e.g., auditory alerts), and other information can be displayed.

Still referring to FIG. 7, the display of the alarms in response to the receipt of the simulated phasor measurement unit data can be contemporaneous with the display of information acquired by a supervisory control and data acquisition component (e.g., SCADA component 420).

Still referring to FIG. 7, in some example embodiments, the event insertion component (e.g., event insertion component 505) can operate in a mode of operation (e.g., also referred to as "slow mode) in which a simulated steady-state power flow result (e.g., simulated steady-state power flow data) is sent to a supervisory control and data acquisition component (e.g., SCADA component 420) that is operable to acquire power delivery related information and control power delivery equipment in the electrical distribution system. In example embodiments, in when in a second mode of operation (e.g., fast mode), state calculations based on the bus voltages and frequencies obtained from the fast engine can be performed. This method of calculation and updating SCADA ensures that the fast transients and non-uniform frequency effects are observable on the SCADA side, and on any downstream EMS application in the simulation environment.

Now referring to FIG. 8, in non-limiting embodiments (also referred to as example embodiments), a system, comprising a processor and a memory that stores executable instructions (e.g., stored on a machine-readable storage medium), that can, when executed by the processor, facilitate performance of operations (e.g., perform a method), or cause a device comprising a processor to perform a method. An example of such a system can be computer 1012 as described below in FIG. 10, or client(s) 1110 as described below in FIG. 11.

At step 805, the operations can comprise receiving simulated phasor measurement unit data from a transient simulation engine component (e.g., transient simulation component 510). The simulated phasor measurement unit data (e.g., PMU data) can be based on a first input received in connection with a user identity (e.g., trainer, instructor, demonstrator, etc.) determined to be interacting with an event insertion component during a run time in which a dispatcher training routine executes. The first input can relate to a scenario involving a simulated disturbance event (e.g., line out/in, unit out/in, load out/in) to an electrical power system (e.g., power grid system). The simulated phasor measurement unit data comprises simulation data that simulates an output by a phasor measurement unit device (e.g., PMU 435) that monitors electrical parameters associated with the electrical power system and that repeatedly obtains measurements of the electrical parameters from the electrical power system.

At step 810, the operations can comprise processing the simulated phasor measurement unit data.

At step 815, the operations can comprise determining an alarm based on the simulated phasor measurement unit data.

At step 820, the operations can comprise generating the alarm for display via a graphical user interface (e.g., GUI).

At step 825, the operations can comprise receiving a second input in connection with the user identity interacting with the system during the run time, wherein the second input is representative of a simulated condition related to the electrical power system to be simulated by the system.

The operations can further comprise transmitting the simulated phasor measurement unit data as a down-sampled dataset. The down-sampled dataset is used by an energy management system component (EMS 425) that facilitates management of the electrical power system. The down-sampled dataset can also be used by a supervisory control and data acquisition component (e.g., SCADA component 420) that acquires power delivery related information and controls power delivery equipment in the electrical distribution system. The down-sampled dataset can also be used by a security assessment tool (e.g., DSA tools 515) that performs system security related analysis of the electrical power system.

Still referring to FIG. 8, the alarm can relate to an angle disturbance alarm generated in response to a detection by the phasor measurement unit device of a difference in phase angle of a voltage associated with the electrical power system, and more specifically, with different nodes in an electrical power system. The alarm can also relate to a frequency disturbance alarm generated in response to a detection by the phasor measurement unit device of a frequency disturbance associated with the electrical power system, or a difference in frequency associated with the electrical power system. In addition to alarms, other alert actions can be performed (e.g., auditory alerts), and other information can be displayed.

Now referring to FIG. 9, in non-limiting embodiments (also referred to as example embodiments), a device, comprising a processor and a memory that stores executable instructions (e.g., stored on a machine-readable storage medium), that can, when executed by the processor, facilitate performance of operations (e.g., perform a method), or cause a device comprising a processor to perform a method.

At step 905, the method can comprise receiving, by an event insertion component (e.g., event insertion component 505) of a system comprising a processor, a first input determined to be from a user identity during a run time in which a dispatcher training routine is executing, wherein the first input represents a disturbance event indicative of a simulated disturbance to an electrical power system (power grid system). As examples, the disturbance event can comprise at least one of a line out disturbance in which a line is out of service from the electrical power system, a unit out disturbance in which a power generating unit is out of service from the electrical power system, or a load out disturbance in which a load has been disconnected from the electrical power system.

At step 910, the method can comprise facilitating, by the event insertion component, transmitting a signal representative of the first input to a transient simulation engine component (e.g., transient simulation engine component 510), wherein the transient simulation engine component processes the signal and, based on the signal, generates a simulated phasor measurement unit data (e.g., PMU data) that is representative of the first input, and that simulates an output by a phasor measurement unit device (e.g., PMU 425) that monitors electrical parameters associated with the electrical power system and repeatedly obtains measurements of the electrical parameters from the electrical power system. The signal can be received by a wide area management system component (e.g., wide area monitoring system, WAMS 445) of the system that processes the simulated phasor measurement unit data and facilitates determining an alarm based on the simulated phasor measurement unit data and generating the alarm for display via a user interface (e.g., a graphical user interface, GUI, etc.). The alarm can relate to an angle disturbance alarm generated in response to a detection by the phasor measurement unit device of a difference in phase angle of a voltage associated with the electrical power system, and more specifically, with different nodes in an electrical power system. The alarm can also relate to a frequency disturbance alarm generated in response to a detection by the phasor measurement unit device of a frequency disturbance associated with the electrical power system, or a difference in frequency associated with the electrical power system.

At step 915, the method can comprise receiving, by the event insertion component, a second input determined to be from the user identity during the run time, wherein the second input is representative of a simulated condition related to the electrical power system to be simulated by the system.

To provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer or computers, those skilled in the art will recognize that the disclosed subject matter also can be implemented in combination with other program modules. Generally, program modules comprise routines, programs, components, data structures, etc. that performs particular tasks or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can comprise read only memory, programmable read only memory, electrically programmable read only memory, electrically erasable read only memory, flash memory, or solid state memory (e.g., solid state drive). Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with example embodiments. Computer 1012 can comprise a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 can comprise read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 can comprise devices like a magnetic disk drive, floppy disk drive, tape drive, flash memory card, or memory stick. In addition, disk storage 1024 can comprise storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and can comprise both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and can comprise any information delivery or transport media. The term "modulated data signal" or signals refers to a signal that has one or more of its characteristics set or changed in such a manner as to encode information in one or more signals. By way of example, and not limitation, communication media can comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software can comprise an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can be embodied in a touch sensitive display panel allowing a user to interact with computer 1012. Input devices 1036 can comprise a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically can comprise many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire or wireless communication networks such as local area networks and wide area networks. Local area network technologies can comprise fiber distributed data interface, copper distributed data interface, Ethernet, Token Ring and the like. Wide area network technologies can comprise point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, including regular telephone grade modems, cable modems and digital subscriber line modems, integrated services digital network adapters, and Ethernet cards.

FIG. 11 is a schematic block diagram of a sample-computing environment 1100 with which the subject matter of this disclosure can interact. The system 1100 can comprise one or more client(s) 1110. The client(s) 1110 can be hardware or software (e.g., threads, processes, computing devices). The system 1100 also can comprise one or more server(s) 1130. Thus, system 1100 can correspond to a two-tier client server model or a multi-tier model (e.g., client, middle tier server, data server), amongst other models. The server(s) 1130 can also be hardware or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 can comprise a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects or features of this disclosure can be exploited in substantially any wired or wireless communications technology. Wireless communications technology can comprise, for example, wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer or computers, those skilled in the art will recognize that this disclosure also can or may be implemented in combination with other program modules. Generally, program modules can comprise routines, programs, components, data structures, etc. that perform particular tasks or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, or a computer. By way of illustration and not limitation, both an application running on a server and the server can be a component. One or more components may reside within a process or thread of execution and a component may be localized on one computer or distributed between two or more computers. In addition, these components can execute from various computer readable media having various data structures stored thereon. The components may communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term (e.g., including, but not limited to), rather than a closed or exclusive term. The term "include" can be substituted with the term "comprise" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "operator," "switchman," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above can comprise examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving at an event insertion component a first input associated with a user identity during a run time when a dispatcher training routine is executing, wherein the first input represents a simulated disturbance event indicative of a simulated disturbance to an electrical power system;
        based on the first input, facilitating transmitting a signal to a transient simulation engine component, enabling the transient simulation engine component to output simulated phasor measurement unit data representative of the simulated disturbance event to a wide area monitoring system that facilitates a display of an alarm in response to the receipt of the simulated phasor measurement unit data; and
        receiving a second input associated with the user identity during the run time, wherein the second input is representative of a simulated condition related to the electrical power system to be simulated by the system;
        operating the event insertion component in a first mode of operation in which a simulated steady-state power flow result is sent to a supervisory control and data acquisition component that is operable to acquire power delivery related information and control power delivery equipment in the electrical distribution system, the transient simulation engine being driven by the event insertion component and kept in synchronization with respect to the simulated disturbance during the first mode of operation;
        operating the event insertion component in a second mode of operation in which the transient simulation engine is driven to produce the simulated phasor measurement unit data, the simulated phasor measurement unit data being down-sampled and sent to the supervisory control and data acquisition component such that transients and non-uniform frequency effects are observable at the supervisory control and data acquisition component during the second mode of operation;
        wherein information concerning the simulated disturbance event is rendered to operators at both the supervisory control and data acquisition component and at the wide area monitoring system.

2. The system of claim 1, wherein the simulated phasor measurement unit data simulates an output by a phasor measurement unit device that monitors an electrical parameter associated with the electrical power system and repeatedly obtains measurements of the electrical parameter from the electrical power system.

3. The system of claim 1, wherein the wide area monitoring system transmits the simulated phasor measurement unit data as a down-sampled dataset to be used by an energy management system component that facilitates management of the electrical power system.

4. The system of claim 1, wherein the wide area monitoring system transmits the simulated phasor measurement unit data as a down-sampled dataset to be used by a supervisory control and data acquisition component that acquires power delivery related information and controls power delivery equipment in the electrical distribution system.

5. The system of claim 1, wherein the wide area monitoring system transmits the simulated phasor measurement unit data as a down-sampled dataset to be used by a dynamic security assessment tool that performs system security related analysis of the electrical power system.

6. The system of claim 1, wherein the alarm relates to an angle disturbance alarm generated in response to a detection by the phasor measurement unit device of a difference in phase angle of a voltage associated with different nodes in the electrical power system.

7. The system of claim 1, wherein the alarm relates to a frequency disturbance alarm generated in response to a detection by the phasor measurement unit device of a frequency disturbance associated with the electrical power system.

8. The system of claim 1, wherein the display of the alarms in response to the receipt of the simulated phasor measurement unit data is contemporaneous with the display of information acquired by a supervisory control and data acquisition component.

9. A system, comprising:
    a processor; and
    a memory that stores executable instructions that, when executed by the processor, facilitate performance of operations, comprising:

receiving simulated phasor measurement unit data from a transient simulation engine component, wherein the simulated phasor measurement unit data:

is based on a first input received at an event insertion component in connection with a user identity determined to be interacting with an event insertion component during a run time in which a dispatcher training routine executes, the first input relating to a scenario involving a simulated disturbance event to an electrical power system, and comprises simulation data that simulates an output by a phasor measurement unit device that monitors electrical parameters associated with the electrical power system and that repeatedly obtains measurements of the electrical parameters from the electrical power system;

processing the simulated phasor measurement unit data;

determining an alarm based on the simulated phasor measurement unit data;

generating the alarm for display via a graphical user interface; and receiving a second input in connection with the user identity interacting with the system during the run time, wherein the second input is representative of a simulated condition related to the electrical power system to be simulated by the system;

wherein the event insertion component is operated in a first mode of operation in which a simulated steady-state power flow result is sent to a supervisory control and data acquisition component that is operable to acquire power delivery related information and control power delivery equipment in the electrical distribution system, the transient simulation engine being driven by the event insertion component and kept in synchronization with respect to the simulated disturbance during the first mode of operation;

operating the event insertion component in a second mode of operation in which the transient simulation engine is driven to produce the simulated phasor measurement unit data, the simulated phasor measurement unit data being down-sampled and sent to the supervisory control and data acquisition component such that transients and non-uniform frequency effects are observable at the supervisory control and data acquisition component during the second mode of operation;

wherein information concerning the simulated disturbance event is rendered to operators at both the supervisory control and data acquisition component and at a wide area monitoring system.

10. The system of claim 9, wherein the simulated phasor measurement unit data being down-sampled is used by an energy management system component that facilitates management of the electrical power system.

11. The system of claim 9, wherein the simulated phasor measurement unit data being down-sampled is used by the supervisory control and data acquisition component that acquires power delivery related information and controls power delivery equipment in the electrical power system.

12. The system of claim 9, wherein the simulated phasor measurement unit data being down-sampled is used by a security assessment tool that performs system security related analysis of the electrical power system.

13. The system of claim 9, wherein the alarm relates to an angle disturbance alarm generated in response to a detection by the phasor measurement unit device of a difference in phase angle of a voltage associated with different nodes in the electrical power system.

14. The system of claim 9, wherein the alarm relates to a frequency disturbance alarm generated in response to a detection by the phasor measurement unit device of a frequency disturbance associated with the electrical power system.

15. A method, comprising:

receiving, by an event insertion component of a system comprising a processor, a first input determined to be from a user identity during a run time in which a dispatcher training routine is executing, wherein the first input represents a simulated disturbance event indicative of a simulated disturbance to an electrical power system;

facilitating, by the event insertion component, transmitting a signal representative of the first input to a transient simulation engine component, wherein:

the transient simulation engine component processes the signal and, based on the signal, generates a simulated phasor measurement unit data that is representative of the first input, and that simulates an output by a phasor measurement unit device that monitors electrical parameters associated with the electrical power system and repeatedly obtains measurements of the electrical parameters from the electrical power system, and the signal is received by a wide area management system component that processes the simulated phasor measurement unit data and facilitates determining an alarm based on the simulated phasor measurement unit data and generating the alarm for display via a user interface; and receiving, by the event insertion component, a second input determined to be from the user identity during the run time, wherein the second input is representative of a simulated condition related to the electrical power system to be simulated by the system;

wherein the event insertion component is operated in a first mode of operation in which a simulated steady-state power flow result is sent to a supervisory control and data acquisition component that is operable to acquire power delivery related information and control power delivery equipment in the electrical distribution system, the transient simulation engine component being driven by the event insertion component and kept in synchronization with respect to the simulated disturbance during the first mode of operation;

operating the event insertion component in a second mode of operation in which the transient simulation engine component is driven to produce the simulated phasor measurement unit data, the simulated phasor measurement unit data being down-sampled and sent to the supervisory control and data acquisition component such that transients and non-uniform frequency effects are observable at the supervisory control and data acquisition component during the second mode of operation;

wherein information concerning the simulated disturbance event is rendered to operators at both the supervisory control and data acquisition component and at the wide area monitoring system component.

16. The method of claim 15, wherein the simulated disturbance event comprises at least one of a line out disturbance in which a line is out of service from the electrical power system, a unit out disturbance in which a power generating unit is out of service from the electrical power system, or a load out disturbance in which a load has been disconnected from the electrical power system.

17. The method of claim 15, wherein the alarm relates to an angle disturbance alarm generated in response to a detection by the phasor measurement unit device of a difference in phase angle of a voltage associated with the electrical power system.

18. The method of claim 15, wherein the alarm relates to a frequency disturbance alarm generated in response to a detection by the phasor measurement unit device of a difference in frequency associated with the electrical power system.

* * * * *